United States Patent [19]

Tomihisa et al.

[11] Patent Number: 5,683,501

[45] Date of Patent: Nov. 4, 1997

[54] COMPOUND FINE PARTICLES AND COMPOSITION FOR FORMING FILM

[75] Inventors: Daijo Tomihisa, Moriguchi; Shigefumi Kuramoto, Takatsuki; Satoshi Ishida, Kyoto; Tadahiro Yoneda, Ibaraki; Masaya Yoshida, Takatsuki; Ichiro Namura, Suita, all of Japan

[73] Assignee: Nippon Shokubai Co., Ltd., Osaka, Japan

[21] Appl. No.: 334,052

[22] Filed: Nov. 4, 1994

[30] Foreign Application Priority Data

Nov. 9, 1993 [JP] Japan .................................. 5-279915
Dec. 28, 1993 [JP] Japan .................................. 5-336498

[51] Int. Cl.$^6$ ..................................................... C09C 1/36
[52] U.S. Cl. ............. 106/491; 106/287.1; 106/287.11; 106/287.12; 106/287.13; 106/287.14; 106/287.16; 106/287.17; 106/287.19; 106/447; 106/490
[58] Field of Search ........................ 106/287.1, 287.11, 106/287.12, 287.13, 287.14, 287.16, 287.17, 287.19, 447, 490, 491

[56] References Cited

U.S. PATENT DOCUMENTS 5,209,998  5/1993  Kavassalis et al. ................. 430/106

FOREIGN PATENT DOCUMENTS

| 1190038 | 7/1985 | Canada . |
|---|---|---|
| 0049155 | 4/1982 | European Pat. Off. . |
| 0142784 | 5/1985 | European Pat. Off. . |
| 0433727 | 6/1991 | European Pat. Off. . |
| 0505230 | 9/1992 | European Pat. Off. . |
| 528038 | 2/1993 | European Pat. Off. . |
| 0534751 | 3/1993 | European Pat. Off. . |
| 0534753 | 3/1993 | European Pat. Off. . |
| 2681603 | 3/1993 | France . |
| 62-52119 | 3/1987 | Japan . |
| 63-77940 | 4/1988 | Japan . |
| 1-145317 | 6/1989 | Japan . |
| 1-59974 | 11/1989 | Japan . |
| 3-271114 | 12/1991 | Japan . |
| 4-173882 | 6/1992 | Japan . |
| 4-180921 | 6/1992 | Japan . |
| 5-4325 | 1/1993 | Japan . |
| 5-115772 | 5/1993 | Japan . |

OTHER PUBLICATIONS

"Hyomen", vol. 28, No. 4, pp. 286–298, publ. 1990 (no month).

"Sen-i Gakkaishi", vol. 49, No. 3, pp. 130–136, publ. 1993 (no month).

Primary Examiner—Mark L. Bell
Assistant Examiner—Scott L. Hertzog
Attorney, Agent, or Firm—Roylance, Abrams, Berdo & Goodman, L.L.P.

[57] ABSTRACT

Compound fine particles include inorganic fine particles and an organic polymer bound to surfaces of the inorganic fine particles, and have an average particle diameter of 5 to 200 nm and a particle diameter variation coefficient of 50% or less. The compound fine particles are obtainable by hydrolyzing and condensing an organic polymer, wherein the organic polymer has, per molecule, at least one polysiloxane group containing at least one Si—OR$^1$ group, wherein R$^1$ denotes a hydrogen atom, an unsubstituted or substituted alkyl group, or an unsubstituted or substituted acyl group. A compound fine particle dispersion includes the compound fine particles and a dispersion medium. A composition for forming a film includes this dispersion.

36 Claims, No Drawings

COMPOUND FINE PARTICLES AND COMPOSITION FOR FORMING FILM

BACKGROUND OF THE INVENTION

1. Technical Field

The present invention relates to: 1) compound fine particles useful for an additive to various kinds of coatings, molding materials and so forth, 2) a process for producing the particles, 3) a dispersion in which the particles are dispersed in various dispersion media, and 4) a composition for forming a film, which includes the particles and is useful for various coatings, surface-treating agents, coating agents, adhesives, pressure sensitive adhesives, sealants and so forth.

2. Background Art

Hitherto, various kinds of inorganic fine particles have been practically used as an additive to various kinds of coating and molding materials, the object of which is to afford characteristics, such as mechanical strength, flame resistance, hiding power, heat resistance, surface hardness and rust-inhibition. However, the performance of the fine particles has not been sufficient. To overcome these deficiencies, surface modification of the fine particles has been carried out using an organic polymer, and so forth, by various kinds of methods, and various attempts to elevate the affinity between inorganic fine particles and an organic medium have been carried out.

For example, Japanese Official Patent Provisional Publication (Kokai) No. Heisei 3-271114 discloses fine particles obtained by treating silica fine particles having a particle diameter in a range of 5 to 300 nm with a silyl-etherized polymer. Also, Tsubokawa et.al. reported an experiment, wherein a polymerizable functional group or a polymerization-initiating group is introduced onto surfaces of silica fine particles (which are obtained by a gas phase method and have particle diameters in a range of several ten nm), the surfaces of the silica fine particles are then treated by a radical polymerization method or with a silyl group-containing polymer coupling agent, whereby there is obtained silica fine particles on which an organic polymer is grafted ("Hyomen" Vol. 28, No. 4, pp. 286–298, published 1990).

Furthermore, Japanese Official Patent Provisional Publication (Kokai) No. Heisei 5-115772 discloses fine particles having an average particle diameter of 100 nm or less, which are obtained by introducing a polymerizable functional group into the surfaces of silica fine particles, obtained by a gas phase method and having particle diameters in a range of several ten nm, followed by carrying out an emulsion polymerization reaction to graft a polymer onto the silica surfaces. On the other hand, Japanese Official Patent Provisional Publication (Kokai) No. Heisei 4-180921 discloses a method of obtaining silica fine particles having surfaces modified by a polymer, which are obtained by treating the surfaces of colloidal silica having particle diameters of 10 to 5,000 nm with a coupling agent beforehand followed by carrying out surface-treatment by an acidic group-containing polymer. In addition, Yoshinaga et. al. reported an example of silica fine particles having surfaces modified by an organic polymer, which are obtained by treating silica fine particles (the particle diameter distribution of which is narrow and sharp) with an alkoxysilyl group-containing polymer ("Sen-i Gakkaishi", Vol. 49, No. 3, pp. 130–136, published 1993).

Besides these publication, many methods are known for producing inorganic fine particles to be used as a base material, a representative method which includes hydrolyzing and condensing a hydrolyzable organometallic compound in a reaction medium, such as water and alcohol.

For example, Japanese Official Patent Gazette (Kokoku) No. Heisei 1-59974 discloses a method of obtaining silica fine particles having an optimal particle diameter and an excellent, narrow particle diameter distribution by hydrolyzing an organosilicon compound, such as a hydrolyzable alkoxysilane, without significantly changing the concentration of water and ammonia in a reaction solution. Further, Japanese Official Patent Provisional Publication (Kokai) No. Showa 63-77940 discloses a method of obtaining a polymethylsilsesquioxane powder with particles having an almost truly spherical shape and a particle size distribution in a range of ±30% of an average particle diameter; the method includes: having a mixture of methyltrialkoxysilane etc. with an organic solvent as an upper layer and having an aqueous ammonia or amine solution and/or a mixture of ammonia or amine with an organic solvent as a lower layer; and hydrolyzing and condensing the methyltrialkoxysilane at an interface of these layers. Still further, Japanese Official Patent Gazette (Kokoku) No. Heisei 5-4325 discloses a method for producing silica fine particles having high purity and a truly spherical shape, of which average particle diameter is in a range of 0.05 to 20 µm, standard deviation of the particle diameter is in a range of 1.0 to 1.5, and the real specific gravity of particles has been controlled in a range of 1.20 to 2.10.

Acrylic polyols and polyester polyols (which are resin components contained in conventional compositions for forming a film) have excellent performance with regard to weather resistance, workability, etc. However, a coated film obtained by coating a composition containing the above polyols has low surface hardness and is easily damaged. Therefore, compositions for forming a film, such as various coatings, which contain various inorganic fine particles, are produced in order to improve the demerit points while having characteristics, such as mechanical strength, a flame-retardation, hiding power, heat resistance, surface hardness and rust-inhibition.

However, the performance is insufficient. For example, the dispersibility of inorganic fine particles is poor, and the adhesion between the inorganic fine particles and a resin used for the composition for forming a film is insufficient, so that there is a problem that a minute gap at an interface between the fine particles and resin is formed, water permeates the gap and weather resistance of the film greatly decreases.

In order to alleviate such a problem as the aforementioned, compositions for forming a film obtained by using inorganic fine particles, which have surfaces modified by an organic polymer etc. according to various methods, have been used and, thereby, there have been carried out attempts to elevate affinity between the inorganic fine particles and an organic medium such as a coating resin contained in the compositions for forming a film. For example, there is a composition for forming a film containing inorganic fine particles, which are obtained by treating the surfaces of inorganic fine particles with a coupling agent followed by treating the surfaces with an acidic group-containing polymer or an alkoxysilyl group-containing polymer. Further, Japanese Official Patent Provisional Publication (Kokai) No. Heisei 4-173882 discloses an acrylic resin-based composition for coating, which includes an acrylic polyol resin, a binder (such as an isocyanate compound having two or more functional groups), organosol of minerals, and a solvent; and further discloses that, when this composition is used, weather resistance is improved.

The present inventors followed the methods reported in the above patent publications and literature and examined those in detail. As a result, we have found that, when inorganic fine particles are subjected to surface treatment with a coupling agent and then surface treatment with an acidic group-containing polymer or an alkoxy group-containing polymer, unless the drying treatment is performed for the particles, the polymer does not combine with the inorganic fine particles, and so the drying process is essential. Also, we have found that, if such drying treatment is carried out, the cohesion of inorganic fine particles, or the crosslinking between fine particles by the polymer, occurs and the particle diameter distribution of the fine particles becomes broader than that of before the surface treatment. In particular, it became clear that, in the case where inorganic fine particles having an average particle diameter of 200 nm or less is used, the cohesion becomes remarkably great and the average particle diameter of fine particles (which are finally obtained after surface treatment) becomes larger than 200 nm. If the fine particles thus-obtained after the surface treatment are used for a film formation by themselves or by combining them with another resin for coating, the cohesion of fine particles is remarkably great, the average particle diameter is large, and the particle diameter distribution is broad, and therefore, there was found a problem that a transparent and glossy paint film is not obtained.

Furthermore, the conventional method of obtaining inorganic fine particles by hydrolyzing and condensing a hydrolyzable organometallic compound in a reaction medium (such as water and alcohol) was carried out with the object of controlling the particle diameter distribution or particle shape. There has not yet been known any art, in which, in order to improve the formed inorganic fine particles, the bonds between an organic polymer and inorganic fine particles are formed in the course of a hydrolysis and condensation reaction, and the surface modification by an organic polymer is carried out to the forming inorganic fine particles.

In a conventional method which includes combining an acrylic polyol resin with organosol of minerals by using a binder, the storage stability of the resin is poor and a tendency to gelate occurs. Also, there is a high possibility that by-products results from crosslinking between the acrylic polyol resins or between the organosol of minerals. Consequently, it becomes difficult for the binder to selectively and efficiently crosslink only between the acrylic polyol and organosol of minerals. Furthermore, a composition for forming a film containing organosol of minerals, the surfaces of which were modified by an acrylic polyol resin as obtained in the aforementioned method, showed that physical properties such as weather resistance, adhesiveness and flexibility were low and still unsatisfactory.

SUMMARY OF THE INVENTION

Objects of the Invention

It is an object of the present invention to provide compound fine particles, which have a minute average particle diameter, a narrow particle diameter distribution and superior dispersion stability in various kinds of organic solvents and polymers, including inorganic fine particles, the surfaces of which are modified by an organic polymer having especially good affinity with organic matrices.

It is another object of the present invention to provide a process for producing the compound fine particles with good efficiency.

It is also another object of the present invention to provide a compound fine particle dispersion which is useful as an additive for various kinds of coatings, molding materials, etc.

It is also another object of the present invention to provide a film-forming composition, which has excellent performance with regard to weather resistance, dirt resistance, dirt eliminatability, surface hardness, abrasion resistance, chemical resistance, adhesiveness, heat resistance, etc.

Disclosure of the Invention (Compound fine particles)

Compound fine particles of the present invention have an average particle diameter of 5 to 200 nm and a particle diameter variation coefficient of 50% or less, and include inorganic fine particles and an organic polymer bound to surfaces of the inorganic fine particles.

It is preferable that the inorganic fine particles include silica.

It is preferable that the compound fine particles contain at least one kind of alkoxy group in a proportion of 0.01 to 50 mmol/g.

It is preferable that the organic polymer contains a (meth) acrylic monomer unit and is formable into a film.

It is preferable that the compound fine particles have an inorganic matter content of 50 to 99.5% by weight.

(Production process of compound fine particles)

A process of the present invention for producing compound fine particles includes a step of hydrolyzing and condensing an organic polymer (P). The organic polymer (P) has at least one polysiloxane group per molecule. The polysiloxane group contains at least one Si—OR$^1$ group, wherein R$^1$ denotes a hydrogen atom or at least one member selected from the group consisting of alkyl groups, acyl groups, substituted alkyl groups and substituted acyl groups; with the proviso that in the case where plural R$^1$ are included in one molecule of the polymer (P), the plural R$^1$ may be different from each other.

It is preferable that the hydrolyzing and condensing step includes a step of mixing:

a raw material liquid (A) including the organic polymer (P); and a raw material liquid (B) including water.

It is preferable that the hydrolyzing and condensing step includes hydrolyzing and condensing the organic polymer (P) together with a hydrolyzable metallic compound (G).

It is preferable that the metallic compound (G) is at least one member selected from the group consisting of compounds shown by the following general formula (1) and their derivatives:

$$(R^2O)_m MR^3{}_{n-m} \tag{1}$$

wherein:

M denotes at least one metal element selected from the group consisting of Si, Al, Ti and Zr;

R$^2$ denotes a hydrogen atom or at least one member selected from the group consisting of alkyl groups, acyl groups, substituted alkyl groups and substituted acyl groups;

R$^3$ denotes at least one member selected from the group consisting of alkyl groups, cycloalkyl groups, aryl groups, aralkyl groups, substituted alkyl groups, substituted cycloalkyl groups, substituted aryl groups and substituted aralkyl groups;

n denotes a valence number of the metal element M; and m denotes an integer of 1 to n;

with the proviso that in the case where plural R$^2$ and/or R$^3$ are included in one molecule of the metallic compound (G), the plural R$^2$ and/or R$^3$ may be different from each other.

It is preferable that the hydrolyzing and condensing step includes a step of mixing:

a raw material liquid (A) including the organic polymer (P) and the metallic compound (G); and a raw material liquid (B) including water.

It is preferable that the metallic compound (G) is at least one member selected from the group consisting of silane compounds (H) and their derivatives. The silane compounds (H) contain an Si element as the metal element M in the formula (1).

(Compound fine particle dispersion)

A compound fine particle dispersion of the present invention includes compound fine particles and a dispersion medium. The compound fine particles have an average particle diameter of 5 to 200 nm and a particle diameter variation coefficient of 50% or less, and include inorganic fine particles and an organic polymer bound to surfaces of the inorganic fine particles.

It is preferable that the inorganic fine particles include silica.

It is preferable that the organic polymer contains a (meth) acrylic monomer unit and is formable into a film, and that the compound fine particles contain at least one kind of alkoxy group in a proportion of 0.01 to 50 mmol/g and have an inorganic matter content of 50 to 99.5% by weight.

Another compound fine particle dispersion of the present invention includes compound fine particles and a dispersion medium. The particles are obtainable by the above-mentioned production process of the present invention.

(Composition for forming a film)

A composition of the present invention for forming a film includes a compound fine particle dispersion. The dispersion includes compound fine particles and a dispersion medium. The compound fine particles have an average particle diameter of 5 to 200 nm and a particle diameter variation coefficient of 50% or less, and include inorganic fine particles and an organic polymer bound to surfaces of the inorganic fine particles.

It is preferable that the inorganic fine particles include silica.

It is preferable that the organic polymer contains a (moth) acrylic monomer unit and is formable into a film, and that the compound fine particles contain at least one kind of alkoxy group in a proportion of 0.01 to 50 mmol/g and have an inorganic matter content of 50 to 99.5% by weight.

It is preferable that the organic polymer contains a hydroxyl group, and that the composition further includes at least one compound (J) selected from the group consisting of polyfunctional isocyanate compounds, melamine compounds and aminoplast resins.

It is preferable that the composition further includes a polyol (Q) having two or more hydroxyl groups per molecule.

Another composition of the present invention for forming a film includes compound fine particle dispersion. The dispersion includes compound fine particles and a dispersion medium. The compound fine particles are obtainable by the above-mentioned production process of the present invention.

It is preferable that the organic polymer (P) contains a hydroxyl group, and that the composition further includes at least one compound (J) selected from the group consisting of polyfunctional isocyanate compounds, melamine compounds and aminoplast resins.

It is preferable that the composition further includes a polyol (Q) having two or more hydroxyl groups per molecule.

DETAILED DESCRIPTION OF THE INVENTION (Compound fine particles)

Compound fine particles of the present invention have an average particle diameter of 5 to 200 nm and a particle diameter variation coefficient of 50% or less, and include inorganic fine particles and an organic polymer, the organic polymer being bound to surfaces of the inorganic fine particles.

The inorganic fine particles used in the present invention, as long as they are fine particles of an inorganic matter including an optional element, has no special limitation and a suitable inorganic matter is an inorganic oxide. The inorganic oxide is defined as an oxygen-containing metallic compound in which a metal element mainly constitutes a three-dimensional network through bonding with an oxygen atom. A preferable example of the metal element constituting the inorganic oxide is an element selected from the groups of II to VI in the periodic table of elements and a more preferable one is an element selected from the groups of III to V in the periodic table of elements. Among them, an element selected from Si, Al, Ti and Zr is especially preferred, and fine particles including silica containing Si as the metal element constituting the inorganic oxide is the most preferable as the inorganic fine particles. Also, the inorganic oxide may contain: an organic or hydroxyl group; various residual groups derived from the metallic compound (G) (which is used as the later-mentioned raw material); or a portion of the organic polymer. The above organic group is at least one selected from the group consisting of alkyl, cycloalkyl, aryl and aralkyl groups. The inorganic oxide may be of one or more kinds.

The shape of the inorganic fine particles including the above-mentioned inorganic matters may be any shape such as a sphere, needle, plate, scale, or crushed type and it is not especially limited.

The organic polymer in the compound fine particles of the present invention, in the case where it is used for various kinds of coating and molding materials, contributes to improve the dispersibility of the inorganic fine particles and the affinity between the inorganic fine particles and an organic medium and, in the case where it is used for a composition for forming a film, acts as a binder.

The molecular weight, shape, and composition of the organic polymer as well as the presence or absence of a functional group of the organic polymer are not especially limited, and any optional organic polymer can be used. As to the shape of the organic polymer, an optional shape such as a straight chain and branched type and a crosslinked structure can be adopted for use. Preferable practical examples of resins constituting the organic polymer are a (meth)acrylic resin; polystyrene; polyvinyl acetate; a polyolefin such as polyethylene and polypropylene; polyvinyl chloride; polyvinylidene chloride; a polyester such as polyethylene terephthalate; a copolymer of the above compounds; and a resin partly modified by a functional group such as an amino, epoxy, a hydroxyl and carboxyl group. Among those resins, the compound fine particles (which contain the organic polymer including as an essential component an organic polymer containing a (moth)acrylic monomer unit, such as a (meth)acrylic resin, a (meth)acrylic-styrene resin and a (moth)acrylic-polyester resin, and being formable into a film) can be used as a preferable example of the components of the undermentioned composition for forming a film.

Regarding the organic polymer, although an optional organic polymer can be used as mentioned above, an especially preferred example is an organic chain which is contained in the undermentioned organic polymer (P) including an organic chain and a polysiloxane group, having at least one combined polysiloxane group per molecule, and having a structure containing at least one Si—$OR^1$ group in the polysiloxane group.

Although the compound fine particles of the present invention are compound fine particles made by binding an organic polymer to surfaces of the inorganic fine particles, the binding does not mean simple adhesion and sticking together, but means that the organic polymer is not detected in a washing liquid obtained by washing the compound fine particles by an optional solvent, and this fact strongly suggests that a chemical bond is formed between the organic polymer and inorganic fine particles.

Since the compound fine particles of the present invention include the organic polymer bound to surfaces of the inorganic fine particles, the compound fine particles have excellent affinity with an organic matrix.

The compound fine particles may include an organic polymer in the inside of the inorganic fine particles. Because of this, suitable softness and tenacity can be afforded to the inorganic fine particles which form the cores of the compound fine particles. The presence or absence of an organic polymer in the compound fine particles can be confirmed, for example, by heating the compound fine particles at a temperature in a range of 500° to 700° to undergo thermal decomposition of the organic polymer and then, by comparing a measured value of specific surface area of the fine particles (obtained by the thermal decomposition) with a theoretical value of specific surface area calculated from diameters of the fine particles. That is, in the case where an organic polymer is included in the compound fine particles, since the organic polymer thermally decomposes by heating and a large number of fine holes are formed in the fine particles, the specific surface area measured after thermal decomposition of the organic polymer becomes considerably larger than a theoretical value of the specific surface area calculated from diameters of the fine particles.

The average particle diameter of compound fine particles of the present invention is in a range of 5 to 200 nm and a preferable one is from 5 to 100 nm. If the average particle diameter is less than 5 nm, surface energy of the compound fine particles becomes high, so that cohesion etc. easily occurs. If the average particle diameter exceeds 200 nm, in a case of using them for coating etc., physical properties of a paint film, such as transparency, lowers.

The particle diameter variation coefficient of the compound fine particles is 50% or less and a preferable one is 30% or less. If the particle diameter distribution of the compound fine particles is broad, that is, if the particle diameter variation coefficient exceeds 50%, then when used as a filler, a plastic film, etc., the film surface is not smooth and serious unevenness occurs. This is unfavorable.

A preferable alkoxy group content of the compound fine particles of the present invention is in a range of 0.01 to 50 mmol per 1 g of the compound fine particles. The alkoxy group here mentioned denotes an $R^4O$ group combined with a metal element which forms a fine particle structure. Here, $R^4$ is an alkyl group which may be unsubstituted or substituted, and the $R^4O$ groups in the compound fine particles may be either identical with or different from each other. Practical examples of $R^4$ are methyl, ethyl, n-propyl, isopropyl, n-butyl, etc.

The alkoxy group as described above has an effect of elevating the affinity with an organic medium and the dispersibility in an organic medium in the case where the compound fine particles are used for various kinds of coating and molding materials.

The inorganic matter content of the compound fine particles of the present invention is not especially limited, but in the case where the fine particles are added into various resins, in order to effectively obtain inorganic characteristics, such as hardness and heat resistance, of the inorganic matter, it is advantageous that the inorganic matter content of the compound fine particles is as high as possible. A preferable inorganic matter content is in a range of 50 to 99.5% by weight of the compound fine particles.

The organic polymer content of the compound fine particles of the present invention is not especially limited, but a preferable one is in a range of 0.5 to 50% by weight of the compound fine particles.

The compound fine particles of the present invention can be produced by an optional process. The process, as described below in detail, of the present invention for producing compound fine particles is one example and it is not limited by this process.

(Production process of compound fine particles)

A process of the present invention for producing compound fine particles includes a step of hydrolyzing and condensing an organic polymer (P). The organic polymer (p) has at least one polysiloxane group per molecule. The polysiloxane group contains at least one Si—$OR^1$ group, wherein $R^1$ denotes a hydrogen atom or at least one member selected from the group consisting of alkyl groups, acyl groups, substituted alkyl groups and substituted acyl groups; with the proviso that in the case where plural $R^1$ are included in one molecule of the polymer (P), the plural $R^1$ may be different from each other.

The compound fine particles can be produced, even if the organic polymer (p) used for the production process of the present invention is hydrolyzed and condensed alone. In addition, the compound fine particles can also be produced, even if the undermentioned metallic compound (G) is hydrolyzed and condensed together with the organic polymer (P).

The organic polymer (p) includes an organic chain and a polysiloxane group, has at least one combined polysiloxane group per molecule, and has a structure containing at least one Si—$OR^1$ group in the polysiloxane group. In the organic polymer (P), the structure of an organic chain is not especially limited. However, for easy availability of the organic polymer (P), it is preferred that the polysiloxane group and organic chain are bonded by a Si—C bond, Si—O—C bond and so forth. Especially, because the combining site has good resistance to hydrolysis and because hardness in suffering an unfavorable reaction, such as an exchange reaction, at the combining site is desirable; it is further preferred that the polysiloxane group and organic chain are bonded by a Si—C bond.

The structure of organic polymer (P), as long as it is soluble in either or both of the undermentioned organic solvent and water, is not especially limited. Preferable examples are as follows: a polymer containing a polysiloxane group grafted on an organic chain; a polymer in which a polysiloxane group bonds to one end of an organic chain or to both ends; and a polymer containing a polysiloxane group as the core to which two or more straight or branched organic chains are bonded (these organic chains may be either identical with or different from each other). Herein, the organic chain is a part of the polymer (P) other than the polysiloxane group. The main chain in the organic chain mainly contains carbon atoms (the carbon atoms making main chain are from 50 to 100 mol %) and it is preferred if the residual part of the chain contains elements, such as N, O, S, Si and P, because these are easily obtained. Practical examples of a resin constituting the organic chain are a (meth)acrylic resin; a polyolefin such as polystyrene, polyvinyl acetate, polyethylene and polypropylene; a polyester such as polyvinyl chloride, polyvinylidene chloride and polyethylene terephthalate; a copolymer of the above compounds; and a partly-modified resin; so forth. Among those compounds, a resin containing a (meth)acrylic monomer unit is preferred from a viewpoint of the film-formability of the composition of the present invention.

The $R^1O$ group in the Si—$OR^1$ group is a functional group that can undergo hydrolysis and/or condensation and there is at least one $R^1O$ group per one molecule of the organic polymer (P) and, it is preferred if there are 5 groups or more, and more preferred, if there are 20 groups or more. As the number of $R^1O$ groups increases, the reaction sites for hydrolysis and condensation increase and fine particles making a stronger skeleton are obtained. Here, $R^1$ denotes a hydrogen atom or at least one member selected from the group consisting of alkyl groups, acyl groups, substituted alkyl groups and substituted acyl groups. Although the carbon number of alkyl and acyl groups is not especially limited, because the rate of hydrolysis of the $R^1O$ group is fast, the alkyl and acyl groups having a carbon number of 1 to 5 are preferred. Practical examples of the alkyl group having a carbon number of 1 to 5 are alkyl groups such as methyl, ethyl, propyl, isopropyl, n-butyl, secondary butyl, tertiary butyl and pentyl. Practical examples of the acyl groups having a carbon number of 1 to 5 are acyl groups such as acetyl and propionyl. Practical examples of the substituted alkyl and acyl groups are groups in which one or two or more hydrogen atoms in the alkyl and acyl groups are substituted, for example, by: alkoxy groups, such as methoxy and ethoxy; acyl groups, such as acetyl and propionyl; halogen atoms, such as chlorine and bromine. In the case where plural $R^1$ exists in one molecule, the plural $R^1$ may be different from each other. Preferable examples of $R^1$ are a hydrogen atom, a methyl group and an ethyl group, most preferably a methyl group, because the rates of hydrolysis and condensation become fast.

The polysiloxane group having one or more Si—$OR^1$ group combined with Si atoms is a group in which two or more Si atoms are combined in a straight chain or branched type by the polysiloxane bond (Si—O—Si bond). The number of Si atoms contained in the polysiloxane group is not especially limited, but from a viewpoint that many of the $R^1O$ groups can be contained, it is preferable if the average number of Si per one polysiloxane group is four or more and, if it is eleven or more, further preferred. Practical examples of the polysiloxane group are a polymethylmethoxysiloxane, polyethylmethoxysiloxane, polymethylethoxysiloxane, polyethylethoxysiloxane, polyphenylmethoxysiloxane, polyphenylethoxysiloxane group, etc.

Preferable is that, besides bonding with the organic chain and polysiloxane bond (Si—O—Si bond), all the Si atoms in the polysiloxane group are combined with only the $R^1O$ group. In this case, an ionic character of the Si atom increases and, as a result, the rates of hydrolysis and condensation of the RIO group increases and also, the reaction sites in the polymer (P) increase and fine particles having a firmer skeleton are obtained. Practical examples of such a polysiloxane group are a polydimethoxysiloxane, polydiethoxysiloxane, polydiisopropoxysiloxane, poly-n-butoxysiloxane group, etc.

Molecular weight of the organic polymer (P) is not especially limited, but it is preferred that the number-average molecular weight is 200,000 or less and more preferred that it is 50,000 or less. It is unpreferable if the molecular weight is high, because the organic polymer (P) may become insoluble in the undermentioned organic solvents.

The organic polymer (P) can be produced by a process hitherto known in public. For example, the undermentioned processes (1) to (4) are cited, but these processes show no limitation.

(1) A process which includes, in the presence of a silane-coupling agent having a double bond group or a mercapto group, subjecting a monomer reactive in a radical polymerization reaction to radical (co)polymerization and then, an obtained (co)polymer being hydrolyzed and condensed together with either or both of the undermentioned silane compound (H) and derivatives thereof.

(2) A process which includes hydrolyzing and condensing a silane-coupling agent having a double bond group or a mercapto group together with either or both of the undermentioned silane compound (H) and derivatives thereof, and in the presence of a product obtained from the above hydrolysis and condensation (hereinafter, the product is referred to as a polymerizable polysiloxane for short), subjecting a monomer reactive in a radical polymerization reaction to radical (co)polymerization.

(3) A process which includes allowing a silane-coupling agent having a reactive group, such as a double bond, an amino group, an epoxy group and a mercapto group, to react with a polymer having a group reactive with the above-mentioned reactive group and then, hydrolyzing and condensing a here-obtained polymer together with either or both of the undermentioned silane compound (H) and derivatives thereof.

(4) A process which includes hydrolyzing and condensing a silane-coupling agent having a reactive group, such as a double bond, an amino, an epoxy group and a mercapto group, together with either or both of the undermentioned silane compound (H) and derivatives thereof and then, allowing a hydrolysis and condensation product (having the aforementioned reactive group) to react with a polymer having a group reactive with the above reactive group.

Among the above processes, the process (2) is preferred from a viewpoint that the organic polymer (P) can be easily obtained, and that the compound fine particles can be produced with good efficiency.

The hydrolyzable metallic compound (G) can make a three-dimensional network by carrying out hydrolysis and further, condensation. Practical examples of such a metallic compound (G) are a metal halogenide, a metal nitrate, a metal sulfonate, a metal ammonium salt, an organometallic compound, an alkoxy-metallic compound, and derivatives of these metallic compounds, etc. The metallic compound (G) can be used by only one kind or by mixing two or more kinds.

A preferable example of the metallic compound (G) is such that the metal element constituting the metallic compound (G) is at least one metal element selected from the III, IV and V groups in the periodic table. A further preferable metallic compound is such that the metallic element constituting the metallic compound (G) is at least one metal element selected from the group consisting of Si, Al, Ti and Zr. Also, if the hydrolysis rate of the metallic compound (G) is equal to that of the RIO group of the polysiloxane group in the organic polymer (P), because the hydrolysis and condensation can be easy controlled, the Si is extremely preferred as a metal element constituting the metallic compound (G).

Practical examples of the metallic compound (G) are boric acid, ammonium borate, boron tribromide, boron trichloride, boron methyl dichloride, trimethyl borate, triethyl borate, triisopropyl borate, tributyl borate, methylboric acid, dimethyl methylborate, aluminum hydroxide, aluminum chloride, aluminum nitrate, aluminum sulfate, ammonium aluminum sulfate, aluminum trimethoxide, aluminum triethoxide, aluminum triisopropoxide, aluminum tributoxide, dimethylaluminum methoxide, isopropylaluminum dichloride ethylethoxyaluminum chloride, silicon(IV) chloride chlorotrimethylsilane, dichlorodimethylsilane methyltrichlorosilane, dimethyldiethoxysilane phenyltrihydroxysilane, hydroxytrimethylsilane dihydroxydimethylsilane, methyltriacetoxysilane diacetoxydimethylsilane, acetoxytrimethylsilane tetraacetoxysilane, tetramethoxysilane, tetraethoxysilane, tetraisoproxysilane, tetrabutoxysilane, trimethoxysilane, triethoxysilane, methyltrimethoxysilane trimethoxyvinylsilane, 3-glycidoxypropyltrimethoxysilane, 3-chloropropyltrimethoxysilane, 3-mercaptopropyltrimethoxysilane, 3-(2-aminoethylaminopropyl)trimethoxysilane, phenyltrimethoxysilane, phenyltriethoxysilane, dimethoxydimethylsilane, dimethoxymethylsilane, diethoxymethylsilane, diethoxy-3-glycidoxypropylmethylsilane, 3-chloropropyldimethoxymethylsilane, dimethoxymethylphenylsilane, trimethylmethoxysilane, trimethylethoxysilane, dimethyldiethoxysilane, dimethoxydiethoxysilane, germanium tetrachloride, methylgermanium trichloride, dimethylgermanium dichloride, trimethylgermanium chloride, methylgermanium triacetate, dimethylgermanium diacetate, trimethylgermanium acetate, germanium tetramethoxide, germanium tetraethoxide, methylgermanium triethoxide, dimethylgermanium dimethoxide, trimethylgermanium methoxide, stannous chloride, stannic chloride, methyltin trichloride, dimethyltin dichloride, trimethyltin chloride, dibutyltin diacetate, tributyltin hydride, trimethyltin formate trimethyltin acetate, triethyltin hydroxide, dimethyltin dimethoxide, trimethyltin methoxide, dimethyltin diethoxide, dibutyltin dibutoxide, phosphorous acid, phosphoric acid, phosphorus trichloride, phosphorus oxychloride, phosphorus pentachloride, ammonium dihydrogen phosphate, diammonium hydrogen phosphate, triammonium phosphate, methylphosphorous dichloride, phenylphosphorous dichloride, dimethylphosphorous chloride, methyphosphonic dichloride, methylphosphorous acid, methylphosphonic acid, trimethyl phosphite, triethyl phosphite, triisopropyl phosphite, tributyl phosphite, triphenyl phosphite, diethyl methylphosphite, diethyl phenylphosphite, ethyl dimethylphosphite, ethyl diphenylphosphite, trimethyl phosphate, triethyl phosphate, triphenyl phosphate, dimethyl methylphosphate, diethyl ethylphosphate, ethyl dimethylphosphate, methyl diethylphosphate, titanium(IV) chloride, titanium(IV) sulfate, methyltrichlorotitanium, dimethyldichlorotitanium, titanium(IV) methoxide, titanium(IV) ethoxide, titanium (IV) isopropoxide, titanium(IV) butoxide, titanium(IV) 2-ethylhexoxide, titanium(IV) diethoxide dibutoxide, titanium(IV) isopropoxide trioctarate, titanium(IV) diisopropoxide diacrylate, titanium(IV) tributoxide stearate, zirconium(IV) chloride, zirconium(IV) oxychloride, zirconium(IV) acetate, zirconium(IV) lactate, zirconium (IV) methoxide, zirconium(IV) ethoxide, zirconium(IV) isopropoxide, zirconium(IV) butoxide, and so forth.

Furthermore, the derivatives of above metallic compounds can be used as the metallic compound (G). The derivatives are, for example:

metallic compounds in which a part of the hydrolyzable groups, such as halogeno, $NO_3$, $SO_4$, alkoxy, acyloxy group, is substituted by a group formable into a chelate compound, such as a dicarboxylic acid group, an oxycarboxylic acid group, a β-diketone group, β-ketoester group, β-diester group and an alkanolamine group;

or an oligomer and a polymer obtained by subjecting either or both of the above metallic compound and chelate-substituted metallic compound to either or both of partial hydrolysis and condensation reactions; and so forth.

Preferable examples of the chelate-substituted compounds are titanium(IV) diisopropoxide diacetylacetonate, titanium(IV) oxide acetylacetonate, titanium(IV) dibutoxide bis(triethanolaminate), titanium(IV) dihydroxide dilactate, zirconium(IV) acetylacetonate, zirconium(IV) acetylacetonate butoxide, zirconium(IV) butoxide triethanolamine, aluminium acetylacetonate, etc.

Among those compounds, it is preferred to use at least one member selected from the group consisting of compounds shown by the following general formula (1) and their derivatives:

$$(R^2O)_m MR^3_{n-m} \qquad (1)$$

wherein:

M denotes at least one metal element selected from the group consisting of Si, Al, Ti and Zr;

$R^2$ denotes a hydrogen atom or at least one member selected from the group consisting of alkyl groups, acyl groups, substituted alkyl groups and substituted acyl groups;

$R^3$ denotes at least one member selected from the group consisting of alkyl groups, cycloalkyl groups, aryl groups, aralkyl groups, substituted alkyl groups, substituted cycloalkyl groups, substituted aryl groups and substituted aralkyl groups;

n denotes a valence number of the metal element M; and m denotes an integer of 1 to n;

with the proviso that in the case where plural $R^2$ and/or $R^3$ are included in one molecule of the metal compound (G), the plural $R^2$ and/or $R^3$ may be different from each other.

Practical examples of the alkyl group in $R^2$ are methyl, ethyl, isopropyl, n-butyl, secondary butyl, tertiary butyl, pentyl, etc. Practical examples of the acyl group in $R^2$ are acetyl,propionyl, etc. Preferable $R^2$ are a hydrogen atom, a methyl group and an ethyl group, most preferably a methyl group, because the rates of hydrolysis and condensation of the $R^2O$ group becomes fast.

Practical examples of the alkyl group in $R^3$ are methyl, ethyl, propyl, isopropyl, n-butyl, secondary butyl, tertiary butyl, pentyl, etc. Those of the cycloalkyl group in $R^3$ are cyclohexyl etc. Those of the aryl group in $R^3$ are phenyl, tolyl, xylyl, etc. Those of the aralkyl group in $R^3$ are benzyl etc. The alkyl, cycloalkyl, aryl and aralkyl groups which may be substituted denote that one or two hydrogen atoms may be substituted, for example, by: alkoxy groups, such as methoxy and an ethoxy group; or functional groups, such as amino, nitro, epoxy and halogen-groups.

Practical examples of the metallic compound (G) are methyltriacetoxysilane dimethyldiacetoxysilane, trimethylacetoxysilane tetraacetoxysilane, tetramethoxysilane, tetraethoxysilane, tetraisopropoxysilane tetrabutoxysilane, methyltrimethoxysilanene, phenyltrimethoxysilane, phenyltriethoxysilane, dimethoxydimethylsilane, dimethoxymethylphenyl silane trimethylmethoxysilane, trimethylethoxysilane, dimethyldiethoxysilane, dimethoxydiethoxysilane, aluminum trimethoxide, aluminum triethoxide, aluminum triisopropoxide, aluminum tributoxide, dimethylaluminum methoxide, titanium(IV) methoxide, titanium(IV) ethoxide, titanium(IV) isopropoxide, titanium(IV) butoxide, titanium(IV) 2-ethylhexoxide, titanium(IV) diethoxide dibutoxide, titanium(IV) isopropoxide trioctarate, titanium(IV) diisopropoxide diacrylate, titanium(IV) tributoxide stearate, zirconium(IV) acetate, zirconium(IV) methoxide, zirconium (IV) ethoxide, zirconium(IV) isopropoxide, zirconium(IV) butoxide, etc. Practical examples of the metallic compound (G) derivatives denoted by the general formula (1) are titanium(IV) diisopropoxide diacetylacetonate, titanium(IV) oxide diacetylacetonate, titanium(IV) dibutoxide bis (triethanolaminate), titanium(IV) dihydroxide dilactate, zirconium(IV) acetylacetonate, zirconium(IV) acetylacetonate butoxide, zirconium(IV) butoxide triethanolamine, aluminium acetylacetonate, etc.

It is preferable to use at least one kind selected from a silane compound (H) and its derivatives in which M in the general formula (1) is Si, because it is industrially easily available and does not contain any halogen and so forth which badly affects several properties of manufacturing devices and last stage products.

Practical examples of the silane compound (H) are methyltriacetoxysilane, dimethyldiacetoxysilane, trimethylacetoxysilane tetraacetoxysilane, tetramethoxysilane, tetraethoxysilane, tetraisopropoxysilane tetrabutoxysilane, methyltrimethoxysilane, phenyltrimethoxysilane, phenyltriethoxysilane, dimethoxydimethylsilane, dimethoxymethylphenylsilane, trimethylmethoxysilane, trimethylethoxysilane, dimethyldiethoxysilane, dimethoxydiethoxysilane, etc. Practical examples of the silane compound derivatives are hydrolysis and condensation products of the silane compound (H).

Among the silane compounds (H), the alkoxy silane compounds are easily available as raw material, and so are especially preferable. Also, if the silane compound (H) and its derivatives are the $Si(OR^2)_4$ and its derivative, the rates of hydrolysis and condensation are fast and compound fine particles having a firmer skeleton are obtained, so that it is preferable.

The compound fine particles of the present invention are produced by hydrolyzing and condensing the organic polymer (P) solely or together with the metallic compound (G). The method of hydrolysis and condensation is not especially limited, because the reaction can be easily carried out, the hydrolysis and condensation in a solution is preferable. The solution here-mentioned means a solution containing either or both of the undermentioned organic solvent and water, and the composition of the solution is not especially limited.

Practical examples of the organic solvent are aromatic hydrocarbons, such as benzene, toluene and xylene; esters, such as methyl acetate, ethyl acetate, propyl acetate, n-butyl acetate, isobutyl acetate, ethylene glycol acetate monomethyl ether, ethylene glycol acetate monoethyl ether, ethylene glycol acetate monobutyl ether, propylene glycol acetate monomethyl ether, propylene glycol acetate monoethyl ether and propylene glycol acetate monobutyl ether; ketones, such as acetone, methyl ethyl ketone and methyl isobutyl ketone; ethers, such as tetrahydrofuran, dioxane, ethyl ether and di-n-butyl ether; alcohols, such as methanol, ethanol, isopropyl alcohol, n-butanol, ethylene glycol, ethylene glycol monomethyl ether, ethylene glycol monoethyl ether, ethylene glycol monobutyl ether, propylene glycol, propylene glycol monomethyl ether, propylene glycol monoethyl ether and propylene glycol monobutyl ether; and halogenated hydrocarbons, such as dichloromethane and chloroform. One kind or two or more kinds of these organic solvents may be used. It is especially preferred to use alcohols, ketones and ethers soluble in water as an essential solvent.

Although the hydrolysis and condensation of the organic polymer (P) alone or together with the metallic compound (G) can be carried out in the absence of a catalyst, one kind or two or more kinds of an acidic or a basic catalyst can be used. Practical examples of the acidic catalyst are inorganic acids, such as hydrochloric acid, sulfuric acid, nitric acid and phosphoric acid; organic acids, such as acetic acid, propionic acid, oxalic acid and p-toluenesulfonic acid; and acidic ion-exchange resins; and so forth. Practical examples of the basic catalyst are ammonia; organic amines, such as triethylamine and tripropylamine; alkali metal compounds, such as sodium methoxide, sodium ethoxide, potassium methoxide, potassium ethoxide, potassium tertiary-butoxide, sodium hydroxide and potassium hydroxide; basic ion-exchange resins; and so forth. Regarding the kind of catalysts, a basic catalyst is preferable to an acidic catalyst, because an inorganic component obtained from the hydrolysis and condensation forms a firmer skeleton.

The raw material composition in the hydrolysis and condensation is not especially limited, but it is preferable to use the organic polymer (P) in an amount of 0.1 to 80% by weight, more preferably 0.5 to 30% by weight, based on the total amount of the raw material composition (including the organic polymer (P), the metallic compound (G), an organic solvent, a catalyst, water and so forth). A preferable amount of the metallic compound (G) is from 0 to 80% by weight and a further preferable amount is from 0 to 50% by weight. A preferable amount of the organic solvent is from 0 to 99.9% by weight and a further preferable amount is from 20 to 99% by weight. A preferable amount of the catalyst is from 0 to 20% by weight and a further preferable amount is from 0 to 10% by weight.

The amount of water used in the hydrolysis and condensation is not especially limited as long as it is sufficient to convert the organic polymer (P) alone or together with metallic compound (G) into particles, by the hydrolysis and condensation, however, in order to carry out the hydrolysis and condensation more sufficiently and to make a firmer particle skeleton, it improves as the amount of water increases. Practically, the mole ratio of water based on the hydrolyzable groups undergoing hydrolysis and condensation is 0.1 or more, and a preferred ratio is 0.5 or more and a further preferred ratio is 1 or more, and when the hydrolysis and condensation are carried out under these conditions, the compound fine particles are obtained.

The procedure of the hydrolysis and condensation is not especially limited, however, a practical example is carried out by mixing the organic polymer (P) or its solution and, in the case where the metallic compound (G) is also used, the metallic compound (G) or its solution, into a solution containing water and then, stirring the reaction solution at a reaction temperature of 0° to 100° C., preferably from 0° to 70° C., for from 5 minutes to 100 hours. At this stage, the organic polymer (P) or its solution and the metallic compound (G) or its solution are added for the reaction by an optional method, such as mixing together or each individually, at one time or portionwise, or continuously. Also, on reversing the adding procedure, the solution containing water may be added and mixed into the organic polymer (P) or its solution or the metallic compound (G) or its solution. For the hydrolysis and condensation, one kind or two or more kinds of the aforementioned catalyst can be used. The method using a catalyst is not especially limited, but the catalyst can be used by mixing it with water, an organic solvent, the organic polymer (P) and the metallic compound (G) beforehand. After the reaction is finished, a by-product formed by the hydrolysis and condensation and the catalyst may be removed by filtration or distillation and so forth, and a method to isolate the obtained compound fine particles from the reaction mixture includes the usual method and the compound fine particles can be isolated and purified, for example, by solvent evaporation, centrifugal separation, reprecipitation, ultrafiltration and so forth.

The method of hydrolysis and condensation is not especially limited as described above, but the undermentioned method is more preferable from a viewpoint that the compound fine particles having a narrower (sharper) particle diameter distribution can be produced.

That is, the compound fine particles are preferably produced by mixing the following raw material liquids (A) and (B) in a reaction vessel to carry out the hydrolysis and condensation.

Raw material liquid (A): a liquid including the organic polymer (P), or a liquid including the organic polymer (P) and a hydrolyzable metallic compound (G).

Raw material liquid (B): a liquid including water. Also, it is preferable to further mix the following raw material liquid (C) with these raw material liquids (A) and (B) in a reaction vessel.

Raw material liquid (C): a liquid including a hydrolyzable metallic compound (G).

Furthermore, it is preferable to carry out the hydrolysis and condensation using a raw material liquid (A) including at least one kind of hydrolyzable metallic compound (G).

When the hydrolysis and condensation is carried out by the above methods, the formation process of the compound fine particles accompanied with the hydrolysis and condensation is easily controlled and the compound fine particles having a narrower (sharper) particle diameter distribution is obtained.

The raw material liquids (A), (B) and (C) may be supplied into a reaction vessel individually and at the same time. The individual supply of the raw material liquids (A), (B) and (C) into a reaction vessel means that, without mixing before supplying each raw material liquid into the reaction vessel, the supply of each raw material liquid is carried out. The supply of the raw material liquids (A), (B) and (C) at the same time into a reaction vessel means to supply those so that, at an optional time t defined by the following formulae, the supplying ratios of each of the raw material liquids (A) and (C) based on the raw material liquid (B), $X_a$ and $X_c$ are preferably in a range of 0.1 to 10, further preferably from 0.2 to 3, and extremely preferably from 0.5 to 2.

$$X_a = (a/A)/(b/S)$$

$$X_c = (c/C)/(b/B)$$

In the formulas, A, B and C denote respectively the total amounts of the raw material liquids (A), (B) and (C). Also, a, b and c denote respectively the already supplied amounts at an optional time t of raw material liquids (A), (B) and (C).

Since the drying process is essential in the conventional surface treatment of inorganic fine particles, cohesion and crosslinking of the particles take place during the drying, the particle diameter of inorganic fine particles becomes large and the particle diameter distribution becomes broad, whereas in the production process of the present invention a uniform reaction is carried out and the rate of formation of the compound fine particles does not show large unevenness, and therefore the particle diameter distribution is narrow.

In the surface treatment by a conventional coupling agent for inorganic particles, there are only a few reactive groups (which are reactable with inorganic fine particles) per one molecule of the coupling agent and, even the silane-coupling agent, which is a representative coupling agent, usually has at most three reactive groups per molecule. On the other hand, in the case where all the Si atoms in the polysiloxane group of organic polymer (P) used in the present invention are combined only with alkoxy groups, except for being combined with an organic chain and making the polysiloxane bond, the number of reactive groups is greater than a conventional one. Even if such an organic polymer is allowed to react in a solution, it reacts almost quantitatively because there are many reactive groups, and thereby, a complicated drying process is unnecessary and also, the organic polymer can be used effectively.

(Compound fine particle dispersion)

A compound fine particle dispersion of the present invention includes compound fine particles and a dispersion medium. The compound fine particles have an average particle diameter of 5 to 200 nm and a particle diameter variation coefficient of 50% or less, and include inorganic fine particles and an organic polymer bound to surfaces of the inorganic fine particles.

Another compound fine particle dispersion of the present invention includes compound fine particles and a dispersion medium. The compound fine particles are obtainable by the aforementioned production process of the present invention.

That is, the dispersion is a dispersion using various dispersion media, such as:

a dispersion in which the compound fine particles of the present invention are dispersed in an optional solution;

a reaction mixture obtained by the production process of the present invention;

a dispersion obtained by displacing a solvent in the reaction mixture with another solvent by distillation under heating conditions; and a dispersion obtained by isolating the compound fine particles (this isolation is carried out by solvent distillation, centrifugal separation, reprecipitation or ultrafiltration of the reaction mixture) and then dispersing the isolated compound fine particles into a dispersion medium.

The dispersion of the present invention does not contain large-sized particles, cohered matter or a precipitate, and it has properties whereby the formation of precipitates or the gelation does not occur for a long period of time. The dispersed condition of the compound fine particles in the dispersion can be confirmed by measuring the particle size distribution by a light-scattering method and so forth. Differing from dispersions obtained from conventional processes, the dispersion of the present invention is a dispersion in which no cohesion of the compound fine particles occurs and which maintains a sharp particle diameter distribution.

As to the dispersion medium of the dispersion of the present invention; its composition etc. are not especially limited, but an organic solvent or water (in which an organic chain of the compound fine particles is soluble) is preferable. The dispersion (in which the compound fine particles are dispersed in water and/or at least one organic solvent selected from the group consisting of esters, alcohols, ketones and aromatic hydrocarbons among the organic solvents explained with regard to the aforementioned production process) shows excellent storage stability for a long period of time, and has excellent dispersion stability in various organic solvents. So this dispersion can be used in various ways, such as an additive to various coatings and molding materials.

The concentration of the compound fine particles in the dispersion of the present invention is not especially limited, but preferable one is in a range of 0.5 to 70% by weight and further preferable one is from 1 to 50% by weight. If the concentration is high, the viscosity of the dispersion becomes high and so it becomes difficult to use the dispersion in various ways.

(Composition for forming a film)

A composition of the present invention for forming a film includes a compound fine particle dispersion. The dispersion includes compound fine particles and a dispersion medium. The compound fine particles have an average particle diameter of 5 to 200 nm and a particle diameter variation coefficient of 50% or less, and include inorganic fine particles and an organic polymer bound to surfaces of the inorganic fine particles.

Another composition of the present invention for forming a film includes a compound fine particle dispersion. The dispersion includes compound fine particles and a dispersion medium. The compound fine particles are obtainable by the aforementioned production process of the present invention.

The organic polymer constituting the compound fine particles contained in the composition for forming a film is not especially limited, but preferable ones are a (meth)acryl-based resin, (meth)acryl-styrene-based resin and (meth)acryl-polyester-based resin.

When compared with conventional compositions for forming a film, since the composition of the present invention contains the compound fine particles, the physical properties of coated films are improved when compared with conventional films. For example, a composition for forming a film (obtained by adding the compound fine particles of the present invention into a common resin for coating etc.) gives a paint film showing excellent coated film properties, such as surface hardness, heat resistance, abrasion resistance, dirt resistance and so forth.

If the composition for forming a film contains an organic matrix (such as a resin for coating), the compound fine particles display a good affinity with the organic matrix, and the organic polymer (contained in the compound fine particles) can serve as a binder. Therefore, even if the composition itself is coated on various kinds of base materials, an obtained coated film does not cause white muddiness or cracking and so is excellent in the properties, such as weather resistance, dirt resistance, dirt eliminatability, surface hardness, abrasion resistance, chemical resistance, adhesiveness and heat resistance.

The compound fine particles obtained by the present invention have a structure in which the organic polymer is bound to surfaces of inorganic fine particles. Since the organic polymer serves as a binder, the compound fine particles can form a coated film even if the compound fine particles themselves are solely coated on the undermentioned various kinds of base materials. So the composition including the dispersion of the compound fine particles can provide an excellent coated film which is transparent and glossy.

As to the composition of the present invention, its amount or the presence or absence of other components, such as resins for coating, are not especially limited as long as the composition includes the dispersion containing the compound fine particles. However, if the organic polymer contained in the composition forms a crosslinked structure in a coated film made by coating the composition; then the coated film properties, such as chemical resistance, heat resistance and surface hardness, are favorably improved.

Examples of the compositions (containing the organic polymer which forms a crosslinked structure in a coated film made finally after coating the composition) are given below:

(1) a composition which includes a dispersion and a compound or resin having two or more functional groups (Y) reactable with a functional group (X), wherein the dispersion contains compound fine particles having the functional group (X) and being obtainable by the aforementioned production process using an organic polymer (P) having the functional group (X);

(2) a composition which includes a first dispersion and a second dispersion, wherein the first dispersion contains first compound fine particles having a functional group (X) and being obtained by the aforementioned production process using an organic polymer (P) having the functional group (X), and wherein the second dispersion contains second compound fine particles having a functional group (Y) reactable with the functional group (X) and being obtained by the aforementioned production process using an organic polymer (P) having the functional group (Y);

(3) a composition which includes a first dispersion, a second dispersion, and a compound or resin having two or more functional groups (Y) reactable with a functional group (X), wherein the first dispersion contains first compound fine particles having the functional group (X) and being obtained by the aforementioned production process using an organic polymer (P) having the functional group (X), and wherein the second dispersion contains second compound fine particles having a functional group (W) reactable with the functional group (X) and being obtained by the aforementioned production process using an organic polymer (P) having the functional group (W); and (4) the above-mentioned compositions (1) to (3) which further contain a compound and/or resin having two or more functional groups (X).

Preferable examples of the functional group (X) are groups, such as hydroxyl, carboxyl, amino, epoxy, mercapto, oxazoline and aldehyde groups. Preferable examples of the functional groups (Y) and (W) reactive with the functional group (X) are groups, such as isocyanate, epoxy, hydroxyl, mercapto, amino, unsaturated, and carboxyl groups.

In the compound fine particles having the functional group (X), (Y) or (W), the number of each functional group is not especially limited, but if it is too small, there is a trend that the number of crosslinking points decreases and the coated film properties such as chemical resistance, heat resistance, surface hardness and so forth lower.

In particular, the composition (which includes a dispersion containing compound fine particles having a hydroxyl group as the functional group (X) and further includes at least one compound (J) selected from the group consisting of polyfunctional isocyanate compounds, melamine compounds and aminoplast resins as the compound and/or resin having two or more functional groups (Y) reactable with a hydroxyl group) has excellent storage stability and can give a glossy coated film with excellent properties, such as dirt resistance, flexibility, weather resistance and storage stability. So such a composition is preferable. Similarly to the above, a preferable composition for forming a film includes a dispersion containing compound fine particles having a hydroxyl group in the organic polymer, and further includes at least one compound (J) selected from the group consisting of polyfunctional isocyanate compounds, melamine compounds and aminoplast resins.

Preferable examples of the polyfunctional isocyanate compounds are an aliphatic, alicyclic, aromatic compound, other polyfunctional isocyanate compounds and modified compounds of the above compounds. Practical examples of the polyfunctional isocyanate compounds are a biuret product and/or an isocyanate product of tolylene diisocyanate, xylylene diisocyanate, diphenylmethane diisocyanate, hexamethylene diisocyanate, isophorone diisocyanate, ligin diisocyanate, 2,2,4-trimethylhexylmethane diisocyanate, methylcyclohexane diisocyanate, 1,6-hexamethylene diisocyanate and so forth; a trimer of an isocyanurate and so forth; compounds being formed by a reaction of the above polyfunctional isocyanates with a polyhydric alcohol, such as propanediol, hexanediol, polyethylene glycol and trimethylolpropane, in which two or more isocyanate groups remain; blocked polyfunctional isocyanate compounds in which the above polyfunctional compounds were blocked by alcohols, such as ethanol and hexanol; compounds having a phenolic hydroxyl group, such as phenol and cresol; oximes, such as acetoxime and methyl ethyl ketoxime; and lactams, such as $\epsilon$-caprolactam and $\gamma$-caprolactam. These polyfunctional isocyanate compounds can be used by one kind or a mixture of two or more kinds. In the above compounds, a polyfunctional isocyanate compound which does not have an isocyanate group combined directly with an aromatic ring is preferable in order to prevent a unpreferable color change into yellow.

Examples of the melamine compounds are dimethylolmelamine, trimethylolmelamine, tetramethylolmelamine, pentamethylolmelamine, hexamethylolmelamine, an isobutyl ether type of melamine, a n-butyl ether type of melamine, butylated benzoguanamine, etc.

Practical examples of the aminoplast resins are an alkyl-etherized melamine resin, an urea resin, a benzoguanamine resin, etc. These resins can be used alone or as a mixture or co-condensed product of two or more kinds.

The alkyl-etherized melamine resin is such as obtained by converting an aminotriazine into a methylol derivative followed by converting this methylol into an alkyl ether derivative by cyclohexanol or an alkanol having a carbon number of 1 to 6. Representative resins are a butyl-etherized melamine resin, methyl-etherized melamine resin, methyl and butyl-mixing melamine resin. Also, a sulfonic acid-based catalyst, such as p-toluenesulfonic acid and its amine salt, can be used to accelerate curing.

If a polyol (Q) containing two or more hydroxyl groups per molecule is contained in the composition of the present invention, the coated film properties (such as hardness, flexibility, chemical resistance and so forth) of an obtaining coated film are elevated, so that it is further preferable.

The polyol (Q) containing two or more hydroxyl groups per molecule is not especially limited as long as it is soluble in the aforementioned organic solvents, but it is preferable if it has compatibility with an organic polymer in the compound fine particles, because the gloss and transparency of coated film are elevated. Accordingly, a polyol having the composition of the organic polymer is most preferred.

Preferable examples of the polyol (Q) are a polyol obtained by polymerizing a monomer component containing the undermentioned hydroxyl group-containing unsaturated monomer and a polyester polyol obtained in a condition of excess hydroxyl groups. These compounds can be used alone or as two or more kinds.

Preferable examples of the hydroxyl group-containing unsaturated monomer are as follows:

(a) hydroxyl group-containing unsaturated monomers, such as 2-hydroxyethyl acrylate, 2-hydroxypropyl acrylate, 2-hydroxyethyl (meth)acrylate, 2-hydroxypropyl (meth)acrylate, allyl alcohol, homoally alcohol, cinnamic alcohol and crotonyl alcohol;

(b) hydroxyl group-containing unsaturated monomers obtained from reactions of a dihydric alcohol or an epoxy compound (such as ethylene glycol, ethylene oxide, propylene glycol, propylene oxide, butylene glycol, butylene oxide, 1,4-bis(hydroxymethyl) cyclohexane, phenylglycidyl ether and glycidyl decanoate) with an unsaturated carboxylic acid (such as acrylic acid, methacrylic acid, maleic acid, fumaric acid, crotonic acid and itaconic acid); and (c) hydoxyl group-containing unsaturated monomers, such as Placcel FM-1 (a 1-mol $\epsilon$-caprolactone adduct of 2-hydroxyethyl (meth)acrylate, made by Daiseru Chemical Industries Co., Ltd.), obtained from an additive reaction between 2-hydroxyethyl (meth)acrylate and organic lactone chains. A polyol can be produced by polymerizing at least one kind or more selected from the above hydroxyl group-containing unsaturated monomers.

Also, the polyol can be produced by copolymerizing:

one or more kinds of ethylenic unsaturated monomers, which are selected from the following compounds: ethyl acrylate, n-propyl acrylate, isopropyl acrylate, n-butyl acrylate, tertiary-butyl acrylate, ethylhexyl acrylate, ethyl methacrylate, n-propyl methacrylate, isopropyl methacrylate, n-butyl methacrylate, tertiary-butyl methacrylate, 2-ethylhexyl methacrylate, glycidyl methacrylate, cyclohexyl methacrylate, isobutyl methacrylate, lauryl methacrylate, styrene, vinyltoluene, 1-methylstyrene, acrylic acid, methacrylic acid, acrylonitrile, vinyl acetate, vinyl propionate, vinyl stearate, allyl acetate, diallyl adipinate, diallyl itaconate, diethyl maleate, vinyl chloride, vinylidene chloride, acrylamide, N-methylolacrylamide N-butoxymethylacrylamide, diacetone acrylamide, ethylene propylene, isoprene, etc.; and a hydroxyl group-containing unsaturated monomer selected from the aforementioned monomers (a) and (b).

The molecular weight of a polyol obtained by polymerizing the monomer component containing a hydroxyl group-containing unsaturated monomer is in a range of 1,000 to 500,000 and a preferable one is from 5,000 to 100,000. Also, the hydroxyl value is in a range of 5 to 300 and a preferable one is from 10 to 200.

A polyester polyol obtained in a condition having excess hydroxyl groups can be produced, for example, by carrying out a reaction between:

a polyhydric alcohol, such as ethylene glycol diethylene glycol, propylene glycol, dipropylene glycol 1,3-butanediol, 1,4-butanediol, 1,5-pentanediol, neopentyl glycol, hexamethylene glycol, decamethylene glycol, decamethylene glycol, 2,2,4-trimethyl-1,3-pentanediol, trimethylolpropane, hexanetriol, glycerol, pentaerythritol, cyclohexanediol, hydrogenated bisphenol A, bis(hydroxymethyl)cyclohexane, hydroquinone-bis(hydroxyethyl ether), tris(hydroxyethyl) isocyanurate and xylylene glycol; and a polybasic acid, such as maleic acid, fumaric acid, succinic acid, adipic acid, sebacic acid, azelaic acid, trimellitic acid, terephthalic acid, phthalic acid and isophthalic acid;

under a condition where the number of hydroxyl groups in the polyhydric alcohols is more than the number of carboxyl groups in the polybasic acids.

The molecular weight of a polyester polyol obtained in the aforementioned condition of excess hydroxyl groups is in a range of 500 to 300,000 and preferable is from 2,000 to 100,000. The hydroxyl value is in a range of 5 to 300 and preferable is from 10 to 200.

Although the amount of the polyol (Q) added into the composition for forming a film is optional, the weight ratio in the composition for forming a film between the polyol (Q) and the compound fine particles is in a range of 0/100 to 99/1 and preferable is from 30/70 to 95/5. When the ratio of polyol (Q) is 30% or more, the flexibility of coated film is high and, when the ratio of the compound fine particles is 5% or more, the properties of coated film (such as weather resistance, dirt resistance, dirt eliminatability, surface hardness, abrasion resistance, chemical resistance, adhesiveness and heat resistance) are excellent.

A preferable example of the polyol (Q) is the aforementioned polyester polyol. An acrylic polyol is preferably used, which is a polyol obtained by polymerizing a monomer component including the aforementioned hydroxyl group-containing unsaturated monomer and which is a polyol having a (meth)acrylic monomer unit etc. According to the use, either one of the polyester polyol and acrylic polyol may be used or both may be used.

The number of hydroxyl groups in the polyol (Q) is not especially limited as long as it is two or more per molecule, but if the hydroxyl value in a solid portion is 10 or less, the number of crosslinking sites decreases and there is a trend that chemical resistance, water resistance, heat resistance, surface hardness and so forth is reduced.

The composition of the present invention may be a dispersion in which the compound fine particles are dispersed in various organic solvents and/or water as the dispersion medium. Although the kind and composition of the dispersion medium used are not especially limited, preferable those are either one or both of an organic solvent and water in which an organic chain (contained in the compound fine particles) is soluble. Preferable organic solvents like the above are, for example, the aforementioned organic solvents which are used in the production process of the present invention. The amount of either one or both of the organic solvent and water used is not especially limited and a suitable amount is adopted. Also, a dispersion medium further containing other components (such as various kinds of resins for coating) may also be used.

One or more kinds of additives may be mixed into the composition for forming a film. The additive used for the composition is not especially limited, and preferable examples are various kinds of leveling agents, pigment dispersants, ultraviolet absorbents, antioxidants, viscosity improvers, light stabilizers, metal deactivators, peroxide-decomposing agents, fillers, reinforcers, plasticizers, lubricants, anticorrosives, rust inhibitors, emulsifiers, casting decoloring agents, carbon black, fluorescent brightening agents, organic antiflaming agents, inorganic antiflaming agents, tearing inhibitors, fused flow improvers, antistatic agents. The preferable additives have been described in the specification of Canadian Patent No. 1,190,038.

A pigment can be added to the composition of the present invention and its kind is not especially limited. Preferable examples are inorganic pigments, such as chrome yellow, molybdate orange, Berlin blue, cadmium-based pigments, titanium white, complex oxide pigments and transparent iron oxides; and organic pigments, such as pigments of a cyclic type and a high class, soluble azo pigments, copper phthalocyanine pigments, dyeing pigments and pigment intermediates.

In the case where the composition of the present invention contains at least one compound (J) selected from polyfunctional isocyanate compounds, melamine compounds and aminoplast resins; then, an additional use of a hardening catalyst is preferable to accelerate the crosslinking reaction. An acidic and a basic hardening catalyst can be used as the catalyst. Practical examples of the acidic hardening catalyst are organic sulfonic acids, such as toluenesulfonic acid, methanesulfonic acid and dodecylbenzenesulfonic acid. Practical examples of the basic hardening catalyst are: amine-based catalysts, such as triethylamine, methylimidazol, acridine and hexadecyltrimethylammonium stearate; and organic tin compounds, such as dibutyltin dilaurate, dibutyltin diacetate and stannous octate. One or more kinds of these hardening catalysts may be used and, if necessary, a promoter may be used jointly.

The composition of the present invention can form a coated film on an inorganic elementary material, such as aluminum, stainless steel, galvanized iron, tin plate, steel sheet, concrete, mortar, slate and glass; on an organic elementary material, such as polycarbonate, polymethyl methacrylate, polyethylene terephthalate and paper; and on a film. Also, it can be used according to a common method, such as immersing, spraying, brush coating, roller coating, spin coating and bar coating.

For the coated film obtained from the composition of the present invention, if necessary, baking drying may be carried out.

For example, a coated film is formed by heating for 0.2 or more minutes at a temperature in a range of room temperature to 300° C. This film is transparent and glossy, and so excellent.

DESCRIPTION OF THE PREFERRED EMBODIMENTS

Hereinafter, this invention is illustrated by the following examples of some preferred embodiments in comparison with comparative examples not according to the invention.

The polymerizable polysiloxanes and the organic polymers (P), used in the later-mentioned Examples, were synthesized by the following Production Examples 1 to 14.

PRODUCTION EXAMPLE 1

(Synthesis of polymerizable polysiloxane (S-1))

Into a four-necked 300 ml flask equipped with a stirrer, thermometer and condenser were placed 144.5 g of tetramethoxysilane, 23.6 g of γ-methacryloxypropyltrimethoxysilane, 19 g of water, 30.0 g of methanol and 5.0 g of AMBERLYST 15 (cation exchange resin made by Rohm and Haas Japan K. K.). The resulting mixture was stirred at 65° C. for 2 hours to carry out a reaction. The reaction mixture was cooled to room temperature and then the condenser of the flask was replaced with a distillation column with which a condenser having an outlet for a distillate was connected. The temperature of the reaction mixture was gradually raised to 80° C. over a period of 2 hours under normal pressure and then maintained at the same temperature till methanol distilled no more. Then, the temperature of the reaction mixture was maintained at 90° C.

under a pressure of 200 mmHg to further advance the reaction till methanol distilled no more. The reaction mixture was again cooled to room temperature and then the AMBERLYST 15 was separated by filtration, whereby a polymerizable polysiloxane (S-1) having a number-average molecular weight of 1,800 was obtained.

PRODUCTION EXAMPLE 2

(Synthesis of polymerizable polysiloxane (S-2))

Into a four-necked 300 ml flask equipped with a stirrer, thermometer and condenser were placed 129.3 g of methyltrimethoxysilane, 23.4 g of γ-methacryloxypropyltrimethoxysilane, 18.8 g of water, 30.0 g of methanol and 1.0 g of 35% hydrochloric acid. The resulting mixture was stirred at 65° C. for 1 hour to carry out a reaction. The reaction mixture was cooled to room temperature and then the condenser of the flask was replaced with a distillation column with which a condenser having an outlet for a distillate was connected. The temperature of the reaction mixture was gradually raised to 80° C. over a period of 2 hours under normal pressure and then maintained at the same temperature till methanol distilled no more. Then, the temperature of the reaction mixture was maintained at 90° C. under a pressure of 200 mmHg to further advance the reaction till methanol distilled no more. Next, 2.0 g of triethylamine was added to the flask, whereby a white precipitate was formed. The inside temperature of the flask was raised to 90° C. to remove triethylamine by distillation at 200 mmHg. The reaction mixture was again cooled to room temperature and then the precipitate was separated by filtration, whereby a polymerizable polysiloxane (S-2) having a number-average molecular weight of 3,000 was obtained.

PRODUCTION EXAMPLE 3

(Synthesis of polymerizable polysiloxane (S-3))

The procedure of Production Example 1 was repeated except that 14.1 g of vinyltrimethoxysilane was substituted for 7-methacryloxypropyltrimethoxysilane; whereby a polymerizable polysiloxane (S-3) having a number-average molecular weight of 1,500 was obtained.

PRODUCTION EXAMPLE 4

(Synthesis of polymerizable polysiloxane (S-4))

Into a four-necked 300 ml flask equipped with a stirrer, thermometer and condenser were placed 86.7 g of tetraacetoxysilane, 8 1 g of γ-methacryloxypropyltrimethoxysilane, 6.5 g of water, 18 g of methanol and 3 g of AMBERLYST 15 (as mentioned previously). The resulting mixture was stirred at 65° C. for 2 hours to carry out a reaction. The reaction mixture was cooled to room temperature and then the condenser of the flask was replaced with a distillation column with which a condenser having an outlet for a distillate was connected. The temperature of the reaction mixture was gradually raised to 80° C. over a period of 2 hours under normal pressure and then maintained at the same temperature till methanol distilled no more. Then, the temperature of the reaction mixture was maintained at 90° C. under a pressure of 200 mmHg to further advance the reaction till methanol or acetic acid distilled no more. The reaction mixture was again cooled to room temperature and then the AMBERLYST 15 was separated by filtration, whereby a polymerizable polysiloxane (S-4) having a number-average molecular weight of 2,000 was obtained.

PRODUCTION EXAMPLE 5

(Synthesis of organic polymer (P-1))

Into a 1-liter flask equipped with a stirrer, dropping funnel, thermometer, condenser and $N_2$ gas-introducing tube was placed 200 g of toluene and introduced a $N_2$ gas. The inside temperature of the flask was raised to 110° C. while stirring. Next, a solution (which was beforehand prepared by mixing 20 g of the polymerizable polysiloxane (S-1) (obtained in Production Example 1), 90 g of methyl methacrylate, 90 g of butyl acrylate and 6 g of 2,2'-azobisisobutyronitrile with each other) was dropwise added from the dropping funnel into the flask over a period of 2 hours. Then, the resulting mixture was stirred at 110° C. for 1 hour and then 0.4 g of 1,1'-bis(tertiary-butylperoxy)-3,3,5-trimethylcyclohexane was added initially and again after an interval of 30 minutes. The flask was heated further for 2 hours to carry out a copolymerization reaction, whereby a solution (in which an organic polymer (P-1) having a number-average molecular weight of 2,000 was dissolved in toluene) was obtained. In Table 3 are shown the number-average molecular weight and the solid content of the organic polymer (P-1).

PRODUCTION EXAMPLES 6 TO 14

(Synthesis of organic polymers (P-2) to (P-10))

The procedure of Production Example 5 was repeated except that the raw materials used were changed to those shown in Table 1; whereby solutions (in which organic polymers (P-2) to (P-10) were dissolved in organic solvents) were obtained. In Table 3 are shown the number-average molecular weight and the solid content of each of the organic polymers (P-2) to (P-10).

TABLE 1

| | Organic polymer (P) | Solvent (g) | Polymerizable polysiloxane (g) | | | | AIBN (g) | BOTC (g) | Radical-polymerizable monomer (g) | | | | | | | |
|---|---|---|---|---|---|---|---|---|---|---|---|---|---|---|---|---|
| | | | S-1 | S-2 | S-3 | S-4 | | | MMA | BA | St | 2-EHM EA | AA A | m | AA | HE MA |
| Production Example 5 | P-1 | PhCH₃ 200 | 20 | — | — | — | 6 | 0.8 | 90 | 90 | — | — | — | — | — | — |
| Production | P-2 | PhCH₃ 200 | 20 | — | — | — | 6 | 0.8 | 70 | — | — | 70 | 20 | — | — | 20 |

TABLE 1-continued

| | Organic polymer (P) | Solvent (g) | Polymerizable polysiloxane (g) | | | | AIBN (g) | BPTC (g) | Radical-polymerizable monomer (g) | | | | | | | |
|---|---|---|---|---|---|---|---|---|---|---|---|---|---|---|---|---|
| | | | S-1 | S-2 | S-3 | S-4 | | | MMA | BA | St | EA | 2-EHMA | AAm | AA | HEMA |
| Example 6 Production Example 7 | P-3 | PhCH$_3$ 200 | 20 | — | — | — | 6 | 0.8 | 180 | — | — | — | — | — | — | — |
| Production Example 8 | P-4 | PhCH$_3$ 200 | 20 | — | — | — | 6 | 0.8 | 80 | — | — | 80 | — | 20 | — | — |
| Production Example 9 | P-5 | PhCH$_3$ 200 | — | 20 | — | — | 6 | 0.8 | — | 90 | 90 | — | — | — | — | — |
| Production Example 10 | P-6 | PhCH$_3$ 200 | — | — | 20 | — | 6 | 0.8 | — | 90 | 90 | — | — | — | — | — |
| Production Example 11 | P-7 | PhCH$_3$ 200 | — | — | — | 20 | 6 | 0.8 | — | 90 | 90 | — | — | — | — | — |
| Production Example 12 | P-8 | AcOBu 200 | 20 | — | — | — | 6 | 0.8 | — | 90 | 90 | — | — | — | — | — |
| Production Example 13 | P-9 | PhCH$_3$ 200 | 50 | — | — | — | 6 | 0.8 | — | — | 50 | — | — | — | 100 | — |
| Production Example 14 | P-10 | PhCH$_3$ 200 | 20 | — | — | — | 6 | 0.8 | 80 | — | — | 80 | — | — | — | 20 |

In Table 1 above,
AIBN denotes 2,2'-azobisisobutyronitrile;
BPTC denotes 1,1'-bis(tertiary-butylperoxy)-3,3,5-trimethylcyclohexane;
MMA denotes methyl methacrylate;
BA denotes butyl acrylate;
St denotes styrene;
EA denotes ethyl acrylate;
2-EHMA denotes 2-ethylhexyl methacrylate;
AAm denotes acrylamide;
AA denotes acrylic acid;
HEMA denotes 2-hydroxyethyl methacrylate;
PhCH$_3$ denotes toluene; and
AcOBu denotes n-butyl acetate.

PRODUCTION EXAMPLES 15 TO 18

(Synthesis of organic polymers (P-11) to (P-14))

The procedure of Production Example 5 was repeated except that the raw materials used were changed to those shown in Table 2; whereby solutions (in which organic polymers (P-11) to (P-14) were dissolved in organic solvents) were obtained. In Table 3 are shown the number-average molecular weight and the solid content of each of the organic polymers (P-11) to (P-14).

TABLE 2

| | Organic polymer (P) | Solvent (g) | Polymerizable polysiloxane (g) | | | | AIBN (g) | BPTC (g) | Radical-polymerizable monomer (g) | | | | | | |
|---|---|---|---|---|---|---|---|---|---|---|---|---|---|---|---|
| | | | S-1 | S-2 | S-3 | S-4 | | | MMA | BA | CHMA | St | 2-EHA | AA | HEMA |
| Production Example | P-11 | PhCH$_3$ 200 | 20 | — | — | — | 6 | 0.8 | 60 | 30 | 60 | — | — | — | 30 |

TABLE 2-continued

| Organic polymer (P) | Solvent (g) | Polymerizable polysiloxane (g) | | | | AIBN (g) | BPTC (g) | Radical-polymerizable monomer (g) | | | | | | |
|---|---|---|---|---|---|---|---|---|---|---|---|---|---|---|
| | | S-1 | S-2 | S-3 | S-4 | | | MMA | BA | CHMA | St | 2-EHMA | AA | HEMA |
| Production Example 15 | P-12 | PhCH₃ 200 | 20 | — | — | — | 6 | 0.8 | — | 20 | 120 | — | — | — | 40 |
| Production Example 16 | P-13 | PhCH₃ 200 | 20 | — | — | — | 6 | 0.8 | 60 | — | 60 | 20 | — | — | 40 |
| Production Example 17 | P-14 | AcOEt 200 | 20 | — | — | — | 6 | 0.8 | 60 | — | — | 30 | 30 | 60 | — |

In Table 2 above,
AIBN denotes 2,2'-azobisisobutyronitrile;
BPTC denotes 1,1'-bis(tertiary-butylperoxy)-3,3,5-trimethylcyclohexane;
MMA denotes methyl methacrylate;
BA denotes butyl acrylate;
CHMA denotes cyclohexyl methacrylate;
St denotes styrene;
2-EHMA denotes 2-ethylhexyl methacrylate;
AA denotes acrylic acid;
HEMA denotes 2-hydroxyethyl methacrylate;
PhCH₃ denotes toluene; and
AcOEt denotes ethyl acetate.

The number-average molecular weights of the polymerizable polysiloxanes (obtained in Production Examples 1 to 4) and of the organic polymers (P) (obtained in Production Examples 5 to 18) were analyzed by the following method:
(Number-average molecular weight, Mn)

The number-average molecular weight calculated in terms of standard polystyrene was measured by gel permeation chromatography (GPC) under the following conditions:
(Preparation of sample)

Tetrahydrofuran was used as the solvent, and 0.05 g of the polymerizable polysiloxane or of the organic polymer (P) was dissolved into 1 g of tetrahydrofuran, whereby a sample was obtained.
(Apparatus)

A high-speed GPC apparatus, HLC-8020 made by TOSOH Corporation, was used.
(Column)

G3000H, G2000H and GMH$_{XL}$, made by TOSOH Corporation, were used.
(Standard polystyrene)

TSK standard polystyrene, made by TOSOH Corporation, was used.
(Measurement conditions)

The measurement was carried out at a measurement temperature of 35° C. and at a flow rate of 1 ml/min.

TABLE 3

| Organic Polymer (P) | Number-average molecular weight (Mn) | Solid content of polymer (wt. %) |
|---|---|---|
| Production Example 5 | P-1 | 12,000 | 49.5 |
| Production Example 6 | P-2 | 15,000 | 49.0 |
| Production Example 7 | P-3 | 13,000 | 49.0 |
| Production Example 8 | P-4 | 10,000 | 49.0 |
| Production Example 9 | P-5 | 14,000 | 49.0 |
| Production Example 10 | P-6 | 14,000 | 49.5 |
| Production Example 11 | P-7 | 17,000 | 49.0 |
| Production Example 12 | P-8 | 15,000 | 49.5 |
| Production Example 13 | P-9 | 20,000 | 49.5 |
| Production Example 14 | P-10 | 13,000 | 49.0 |
| Production Example 15 | P-11 | 14,000 | 49.5 |
| Production Example 16 | P-12 | 15,000 | 49.0 |
| Production Example 17 | P-13 | 125,000 | 49.0 |
| Production Example 18 | P-14 | 12,000 | 49.5 |

EXAMPLE 1

(Synthesis of compound fine particle dispersion (Z-1))

Into a four-necked 500 ml flask equipped with a stirrer, thermometer and two dropping funnels (A and B) were placed 200 g of n-butyl acetate and 50 g of methanol, and then the inside temperature of the flask was adjusted to 20° C. Next, while the contents of the flask were stirred, raw material liquids A and B were dropwise added from the dropping funnels A and B, respectively, into the flask over a period of 1 hour. The raw material liquid A was a solution prepared by mixing 20 g of a n-butyl acetate solution of the organic polymer (P-1) (obtained in Production Example 5) with 30 g of tetramethoxysilane and also with 20 g of n-butyl acetate; and the raw material liquid B was a solution prepared by mixing 20 g of a 25% aqueous ammonia solution with 20 g of methanol. After completion of the dropwise addition, the resulting mixture was stirred at 20° C. for 2 hours, whereby a compound fine particle dispersion (Z-1) was obtained. In Table 6 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

In addition, the dispersion (Z-1) was dried by heating them at 120° C. and 150 mmHg for 3 hours to obtain the compound fine particles. The specific surface area of the particles was measured using Autosorb-6 (an apparatus for measuring a gas-adsorption level, made by Yuasa Ionics Co., Ltd.). As a result, it was 4.8 m²/g. In addition, the temperature of the particles was raised to 600° C. and then maintained at this temperature for 2 hours to thermally decompose the organic polymer (which was contained in the particles). As a result, the specific surface area of the particles increased to 227.6 m²/g.

EXAMPLE 2

(Synthesis of compound fine particle dispersion (Z-2))

Into a four-necked 500 ml flask equipped with a stirrer, thermometer and two dropping funnels (A and B) were placed 200 g of n-butyl acetate and 50 g of methanol, and then the inside temperature of the flask was adjusted to 20° C. Next, while the contents of the flask were stirred, raw material liquids A and B were dropwise added from the dropping funnels A and B, respectively, into the flask over a period of 1 hour. The raw material liquid A was a solution prepared by mixing 40 g of a n-butyl acetate solution of the organic polymer (P-1) (obtained in Production Example 5) with 40 g of n-butyl acetate; and the raw material liquid B was a solution prepared by mixing 5 g of a 25% aqueous ammonia solution with 5 g of methanol. After completion of the dropwise addition, the resulting mixture was stirred at 20° C. for 2 hours, whereby a compound fine particle dispersion (Z-2) was obtained. In Table 6 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLES 3 TO 15

(Synthesis of compound fine particle dispersions (Z-3) to (Z-15))

The procedure of Example 1 was repeated except that the kind of each of the organic solvent, organic polymer (P) and metallic compound (G) as well as the amount of each of the organic solvent, aqueous ammonia solution and metallic compound (G) was changed to those shown in Tables 4 and 5; whereby dispersions (Z-3) to (Z-15) were obtained. In Tables 6 and 7 are shown the following data: the concentration of the compound fine particles in each dispersion; the inorganic matter content of the particles; the average particle diameter of the particles; the variation coefficient of the particles; the alkoxy group content of the particles; and the stability of each dispersion over a period of time.

TABLE 4

| | | Formulation of reaction liquid (g) | | | | |
|---|---|---|---|---|---|---|
| | | Solvent initially charged into reaction vessel | Raw material liquid (A) | | Raw material liquid (B) | |
| | Dispersion | | Organic polymer (P) | Organic solvent | Metallic compound (G) | 25% NH₃aq | Organic solvent |
| Example 1 | Z-1 | AcOBu 200 MeOH 50 | P-1 20 | AcOBu 20 | MS 30 | 20 | MeOH 20 |
| Example 2 | Z-2 | AcOBu 200 MeOH 50 | P-1 40 | AcOBu 40 | — | 5 | MeOH 5 |
| Example 3 | Z-3 | AcOBu 200 MeOH 50 | P-1 4 | — | MS 40 | 25 | MeOH 25 |
| Example 4 | Z-4 | EtOCH₂CH₂OH 250 | P-1 20 | EtOCH₂CH₂OH 20 | MS 30 | 20 | EtOCH₂CH₂OH 20 |
| Example 5 | Z-5 | AcOEt 200 MeOH 50 | P-1 20 | AcOEt 20 | MS 30 | 20 | MeOH 20 |
| Example 6 | Z-6 | MEK 200 MeOH 50 | P-1 20 | MEK 20 | MTMS 30 | 20 | MeOH 20 |
| Example 7 | Z-7 | AcOBu 160 MeOH 40 | P-2 40 | AcOBu 40 | MS 60 | 40 | MeOH 40 |

In TABLE 4 above,
AcOBu denotes n-butyl acetate;
MeOH denotes methanol;
MS denotes tetramethoxysilane;
EtOCH₂CH₂OH denotes ethylene glycol monoethyl ether;
AcOEt denotes ethyl acetate;
MEK denotes methyl ethyl ketone; and
MTMS denotes methyltrimethoxysilane.

TABLE 5

| | | Solvent initially charged into reaction vessel | Formulation of reaction liquid (g) | | | | |
|---|---|---|---|---|---|---|---|
| | | | Raw material liquid (A) | | | Raw material liquid (B) | |
| | Dispersion | | Organic polymer (P) | Organic solvent | Metallic compound (G) | 25% NH₃aq | Organic solvent |
| Example 8 | Z-8 | MeOCH₂CH₂OH 250 | P-3 20 | MeOCH₂CH₂OH 20 | MS 30 | 20 | MeOCH₂CH₂OH 20 |
| Example 9 | Z-9 | EtOH 250 | P-4 20 | EtOH 20 | MS 30 | 20 | EtOH 20 |
| Example 10 | Z-10 | AcOCH₂CH₂OEt 200 MeOH 50 | P-5 20 | AcOCH₂CH₂OEt 20 | MTMS 30 | 20 | MeOH 20 |
| Example 11 | Z-11 | AcOBu 200 MeOH 50 | P-6 20 | AcOBu 20 | MS 50 | 35 | MeOH 35 |
| Example 12 | Z-12 | AcMe 250 | P-7 20 | AcMe 20 | MS 30 | 20 | AcMe 20 |
| Example 13 | Z-13 | AcO(i-Bu) 200 MeOH 50 | P-8 20 | AcO(i-Bu) 20 | MS 30 | 20 | MeOH 20 |
| Example 14 | Z-14 | i-PrOH 200 | P-9 15 | i-PrOH 15 | MS 25 | 50 | — |
| Example 15 | Z-15 | BuOH 200 MeOH 50 | P-10 20 | BuOH 20 | MS 30 | 20 | MeOH 20 |

In TABLE 5 above,
MeOCH₂CH₂OH denotes ethylene glycol monomethyl ether;
MS denotes tetramethoxysilane;
EtOH denotes ethanol;
AcOCH₂CH₂OEt denotes 2-ethoxyethyl acetate;
MeOH denotes methanol;
MTMS denotes methyltrimethoxysilane;
AcOBu denotes n-butyl acetate;
AcMe denotes acetone;
AcO(i-Bu) denotes isobutyl acetate;
i-PrOH denotes isopropanol; and
BuOH denotes butanol.

COMPARATIVE EXAMPLE 1

The procedure of Production Example 5 was repeated except that γ-methacryloxypropyltrimethoxysilane was substituted for the polymerizable polysiloxane (S-1); whereby a toluene solution of an organic polymer (P'-1), having a solid content of 49%, was obtained. In addition, the procedure of Example 2 was repeated except that the toluene solution of the organic polymer (P'-1) was substituted for the toluene solution of the organic polymer (P-1) (which was obtained in Production Example 5); whereby a dispersion was obtained. However, in this dispersion, cohesion greatly occurred and so particles precipitated immediately after stopping the stirring.

EXAMPLE 16

(Synthesis of compound fine particle dispersion (Z-16))

Into a four-necked 500 ml flask equipped with a stirrer, thermometer and three dropping funnels (A, B and C) were placed 200 g of n-butyl acetate and 50 g of methanol, and then the inside temperature of the flask was adjusted to 20° C. Next, while the contents of the flask were stirred, raw material liquids A, B and C were dropwise added from the dropping funnels A, B and C, respectively, into the flask over a period of 1 hour. The raw material liquid A was a solution prepared by mixing 20 g of a n-butyl acetate solution of the organic polymer (P-1) (obtained in Production Example 5) with 20 g of n-butyl acetate; the raw material liquid B was a solution prepared by mixing 20 g of a 25% aqueous ammonia solution with 20 g of methanol; and the raw material liquid C was 30 g of tetramethoxysilane. After completion of the dropwise addition, the resulting mixture was stirred at 20° C. for 2 hours, whereby a compound fine particle dispersion (Z-16) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 17

(Synthesis of compound fine particle dispersion (Z-17))

The procedure of Example 16 was repeated except that the reaction temperature was changed to 50° C.; whereby a compound fine particle dispersion (Z-17) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 18

(Synthesis of compound fine particle dispersion (Z-18))

Into a four-necked 500 ml flask equipped with a stirrer, dropping funnel and thermometer were placed 200 g of n-butyl acetate, 70 g of methanol and 20 g of a 25% aqueous ammonia solution. Then, the inside temperature of the flask was adjusted to 20° C. Next, while the contents of the flask were stirred, a mixed liquid of 20 g of a n-butyl acetate solution of the organic polymer (P-1) (obtained in Production Example 5) with 30 g of tetramethoxysilane and also with 20 g of n-butyl acetate was dropwise added from the dropping funnel into the flask over a period of 1 hour. After completion of the dropwise addition, the resulting mixture was stirred at 20° C. for 2 hours, whereby a compound fine particle dispersion (Z-18) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 19

(Synthesis of compound fine particle dispersion (Z-19))

Into a four-necked 500 ml flask equipped with a stirrer, dropping funnel and thermometer were placed 150 g of ethyl cellosolve, 50 g of the toluene solution of the organic polymer (P-1) (obtained in Production Example 5), and 50 g of tetramethoxysilane. Then, the inside temperature of the flask was adjusted to 20° C. Next, while the contents of the flask were stirred, a mixed liquid of 16 g of a 25% of aqueous ammonia solution with 30 g of ethyl cellosolve was dropwise added from the dropping funnel into the flask over a period of 15 minutes. After completion of the dropwise addition, the resulting mixture was stirred at 20° C. for 2 hours, whereby a compound fine particle dispersion (Z-19) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 20

(Synthesis of compound fine particle dispersion (Z-20))

Into a four-necked 500 ml flask equipped with a stirrer and thermometer were placed 150 g of isopropyl alcohol, 30 g of the isopropyl alcohol solution of the organic polymer (P-9) (obtained in Production Example 13), 10 g of titanium tetrachloride, 50 g of distilled water and 10 g of urea. Then, while the contents of the flask were stirred, the inside temperature of the flask was gradually raised and then maintained at 80° C. for 1 hour. Next, $NH_4Cl$, a by-product, was removed by ultrafiltration, whereby a compound fine particle dispersion (Z-20) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 21

(Synthesis of compound fine particle dispersion (Z-21))

Into a four-necked 500 ml flask equipped with a stirrer, thermometer and two dropping funnels was placed 150 g of ethyl cellosolve. Then, the inside temperature of the flask was adjusted to 20° C. Next, while the contents of the flask were stirred, raw material liquids A and B were dropwise added from the dropping funnels A and B, respectively, into the flask over a period of 1 hour. The raw material liquid A was a solution prepared by mixing 50 g of a toluene solution of the organic polymer (P-3) (obtained in Production Example 7) with 10 g of zirconium butoxide and also with 10 g of ethyl cellosolve; and the raw material liquid B was a solution prepared by mixing 20 g of a 25% aqueous ammonia solution with 50 g of ethyl cellosolve. After completion of the dropwise addition, the resulting mixture was stirred at 20° C. for 2 hours, whereby a compound fine particle dispersion (Z-21) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 22

(Synthesis of compound fine particle dispersion (Z-22))

The procedure of Example 21 was repeated except that aluminum isopropoxide was substituted for zirconium butoxide; whereby a compound fine particle dispersion (Z-22) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 23

(Synthesis of compound fine particle dispersion (Z-23))

Into a four-necked 300 ml flask equipped with a stirrer, thermometer and condenser were placed 150.0 g of tetramethoxysilane, 23.3 g of γ-glycidoxypropyltrimethoxysilane, 19.5 g of water, 30.0 g of methanol and 5.0 g of AMBERLYST 15. The resulting mixture was stirred at 65° C. for 2 hours to carry out a reaction. The reaction mixture was cooled to room temperature and then the condenser of the flask was replaced with a distillation column with which a condenser having an outlet for a distillate was connected. The temperature of the reaction mixture was raised to 65° C. and then maintained at this temperature under a pressure of 200 mmHg till methanol distilled no more. Then, the pressure was reduced to 50 mmHg to further advance the reaction. The reaction mixture was again cooled to room temperature and then the AMBERLYST 15 was separated by filtration, whereby a reactive polysiloxane (S-5) having a number-average molecular weight of 1,600 was obtained.

Next, into a four-necked 300 ml flask equipped with a stirrer, thermometer and condenser were placed 5 g of the reactive polysiloxane (S-5), 40 g of a COOH group-containing polyester resin ("VYLON-200" made by Toyobo Co., Ltd. and having a number-average molecular weight of 16,000, a carboxyl group content of 0.02 to 0.06 mmol/g and a hydroxyl group content of 0.1 to 0.15 mmol/g), 160 g of ethyl acetate and 0.5 g of triethylamine. The resulting mixture was heated to 60° C. and then maintained at this temperature for 5 hours, whereby a solution (which had a solid content of 21.9% and in which an organic polymer (P-11) was dissolved in ethyl acetate) was obtained. The number-average molecular weight of the resulting organic polymer was 18,000.

Next, into a four-necked 500 ml flask equipped with a stirrer, dropping funnel and thermometer were placed 120 g of ethyl acetate, 30 g of methanol and 10 g of a 25% of aqueous ammonia solution. Then, the inside temperature of the flask was adjusted to 20° C. Next, while the contents of the flask were stirred, a mixed liquid of 70 g of the above-mentioned ethyl acetate solution of the organic polymer (P-11) with 15 g of tetramethoxysilane was dropwise added from the dropping funnel into the flask over a period of 2 hours. After completion of the dropwise addition, the resulting mixture was stirred at 20° C. for 1 hour, whereby a compound fine particle dispersion (Z-23) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 24

(Synthesis of compound fine particle dispersion (Z-24))

Into a four-necked 500 ml flask equipped with a stirrer, thermometer and distillation column (with which a condenser having an outlet for a distillate was connected) was placed 400 g of the dispersion (Z-7) (as obtained in Example 7). The inside temperature of the flask was raised to 100° C. under a pressure of 110 mmHg, and then ammonia, methanol and n-butyl acetate were distilled off till the solid content of the reaction mixture increased to 30%; whereby a dispersion (Z-24) (in which a compound fine particle was dispersed in n-butyl acetate) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 25

(Synthesis of compound fine particle dispersion (Z-25))

Into a four-necked 500 ml flask equipped with a stirrer, thermometer and distillation column (with which a condenser having an outlet for a distillate was connected) was placed 400 g of the dispersion (Z-4) (as obtained in Example 4). The inside temperature of the flask was raised to 100° C. under a pressure of 110 mmHg, and then ammonia, methanol and ethyl cellosolve were distilled off till the solid content of the reaction mixture increased to 30%; whereby a dispersion (Z-25) (in which compound fine particles were dispersed in ethyl cellosolve) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 26

(Synthesis of compound fine particle dispersion (Z-26))

Into a four-necked 500 ml flask equipped with a stirrer, thermometer and distillation column (with which a condenser having an outlet for a distillate was connected) were placed 350 g of the dispersion (Z-12) (as obtained in Example 12) and 100 g of toluene. The inside temperature of the flask was raised to 100° C. under a pressure of 110 mmHg, and then ammonia, methanol, acetone and toluene were distilled off till the solid content of the reaction mixture increased to 30%; whereby a dispersion (Z-26) (in which compound fine particles were dispersed in toluene) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 27

(Synthesis of compound fine particle dispersion (Z-27))

Into a four-necked 500 ml flask equipped with a stirrer, thermometer and distillation column (with which a condenser having an outlet for a distillate was connected) were placed 250 g of the dispersion (Z-12) (as obtained in Example 12) and 100 g of methyl isobutyl ketone. The inside temperature of the flask was raised to 100° C. under a pressure of 110 mmHg, and then ammonia, methanol, acetone and methyl isobutyl ketone were distilled off till the solid content of the reaction mixture increased to 30%; whereby a dispersion (Z-27) (in which compound fine particles were dispersed in methyl isobutyl ketone) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 28

(Synthesis of compound fine particle dispersion (Z-28))

Into a four-necked 500 ml flask equipped with a stirrer, thermometer and distillation column (with which a condenser having an outlet for a distillate was connected) were placed 250 g of the dispersion (Z-14) (as obtained in Example 14) and 100 g of water. The inside temperature of the flask was raised to 100° C. under a pressure of 150 mmHg, and then ammonia, methanol and isopropyl alcohol were distilled off till the solid content of the reaction mixture increased to 30%; whereby a dispersion (Z-28) (in which compound fine particles were dispersed in water) was obtained. In Table 7 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

The dispersions (Z-1 to Z-28) (obtained in Examples 1 to 28 above) as well as supernatant liquids (obtained by centrifugal separation of each of the dispersions (Z-1 to Z-28)) were analyzed by GPC. However, no organic polymer was detected. In addition, compound fine particles (which was a precipitate obtained by the above-mentioned centrifugal separation) were rinsed with THF (tetrahydrofuran) or water, and then their rinsings were analyzed by GPC. However, no organic polymer was detected. This result shows that the organic polymers were not simply attached to, but strongly bound to the particles.

With regard to the dispersions (obtained in the above-mentioned Examples), the following characters were analyzed and evaluated by the below-mentioned methods: the concentration of the compound fine particles in each dispersion; the inorganic matter content of the particles; the average particle diameter of the particles; the variation coefficient of the particles; the alkoxy group content of the particles; and the stability of each dispersion over a period of time.

(Concentration of compound fine particles in dispersion)

The dispersion was dried at 130° C. and 100 mmHg for 24 hours to determine the concentration from the following formula:

Concentration of compound fine particles in dispersion (%)=D/W× 100 where:

D is the weight (g) of the particles after the drying; and

W is the weight (g) of the dispersion of the particles before the drying.

(Inorganic matter content of compound fine particles)

The dispersion was dried at 130° C. and 100 mmHg for 24 hours, the dried product was subjected to elemental analysis, and then the resulting ash content was defined as the inorganic matter content of the particles.

(Average particle diameter and variation coefficient)

They were measured at 23° C. by a dynamic light-scattering measurement method using the following apparatus. The average particle diameter measured was the volume-average one.

(Apparatus)

A submicron particle diameter analyzer (NICOMP MODEL 370 made by Nozaki & Co., Ltd.).

(Sample for measurement)

A dispersion, in which the compound fine particles were dispersed in tetrahydrofuran within a concentration range of 0.1 to 2.0% by weight, was used (however, in the case where the organic polymer contained in the particles was insoluble in tetrahydrofuran; then, a dispersion, in which the compound fine particles were dispersed in a solvent in which the organic polymer was soluble, was used).

(Variation coefficient)

The variation coefficient was determined from the following formula:

Variation coefficient (%)=(Standard deviation of particle diameters of compound fine particles)/(Average particle diameter of compound fine particles)

(Alkoxy group content of compound fine particles)

The dispersion was dried at 130° C. and 100 mmHg for 24 hours. Five grams of the dried product was dispersed into a mixture of 50 g of acetone with 50 g of an aqueous 2N—NaOH solution and stirred at room temperature for 24 hours. Then, quantitative analysis of alcohol in the resulting mixture was carried out using a gas chromatograph, whereby the alkoxy group content of the compound fine particles was calculated.

(Stability over a period of time)

The dispersion was placed in a Gardener-Holdt bubble viscometer, and this viscometer was sealed and then preserved at 50° C. If no unfavorable result (such as the cohesion or precipitation of particles, or the increase in the viscosity of the dispersion) was provided after 1 month, the stability was shown by the symbol "○".

TABLE 6

| | Dispersion | Concentration of compound fine particles (% by weight) | | Inorganic matter content of compound fine particles (% by weight) | | Average particle diameter (nm) | Variation coefficient (%) | Alkoxy group content of compound fine particles (mmol/g) | Stability over a period of time |
|---|---|---|---|---|---|---|---|---|---|
| | | Theoretical | Found | Theoretical | Found | | | | |
| Example 1 | Z-1 | 5.9 | 5.7 | 58.2 | 58.0 | 56 | 16.5 | MeO— 0.14 | ○ |
| Example 2 | Z-2 | 5.6 | 5.5 | 6.0 | 6.2 | 8 | 28.7 | MeO— 0.03 | ○ |
| Example 3 | Z-3 | 5.2 | 5.2 | 90.0 | 90.8 | 163 | 9.4 | MeO— 0.21 | ○ |
| Example 4 | Z-4 | 5.9 | 6.3 | 58.2 | 57.7 | 63 | 14.2 | MeO— 0.02 | ○ |
| Example 5 | Z-5 | 5.9 | 6.0 | 58.2 | 58.0 | 52 | 20.1 | MeO— 0.19 | ○ |
| Example 6 | Z-6 | 5.9 | 5.8 | 64.8 | 65.0 | 74 | 17.9 | MeO— 0.20 | ○ |
| Example 7 | Z-7 | 10.1 | 9.8 | 58.4 | 58.9 | 79 | 21.3 | MeO— 0.19 | ○ |
| Example 8 | Z-8 | 5.9 | 5.8 | 58.4 | 58.6 | 55 | 19.6 | MeO— 0.02 | ○ |
| Example 9 | Z-9 | 5.9 | 6.1 | 58.4 | 58.4 | 61 | 20.8 | MeO— 0.17 | ○ |
| Example 10 | Z-10 | 5.9 | 6.5 | 65.4 | 65.2 | 69 | 16.4 | MeO— 0.10 | ○ |
| Example 11 | Z-11 | 7.1 | 7.0 | 69.5 | 68.9 | 71 | 15.6 | MeO— 0.17 | ○ |
| Example 12 | Z-12 | 5.9 | 5.4 | 58.4 | 58.7 | 60 | 18.7 | MeO— 0.03 | ○ |
| Example 13 | Z-13 | 5.9 | 5.9 | 58.2 | 57.8 | 55 | 24.7 | MeO— 0.12 | ○ |
| Example 14 | Z-14 | 5.6 | 5.8 | 60.7 | 61.3 | 63 | 18.0 | MeO— 0.01  i-PrO— 0.14 | ○ |

TABLE 7

| | Dispersion | Concentration of compound fine particles (% by weight) Theoretical | Concentration of compound fine particles (% by weight) Found | Inorganic matter content of compound fine particles (% by weight) Theoretical | Inorganic matter content of compound fine particles (% by weight) Found | Average particle diameter (nm) | Variation coefficient (%) | Alkoxy group content of compound fine particles (mmol/g) | Stability over a period of time |
|---|---|---|---|---|---|---|---|---|---|
| Example 15 | Z-15 | 5.9 | 5.7 | 58.4 | 57.8 | 57 | 20.6 | MeO— 0.01<br>BuO— 0.13 | o<br>o |
| Example 16 | Z-16 | 5.9 | 5.8 | 58.2 | 57.7 | 60 | 16.7 | MeO— 0.17 | o |
| Example 17 | Z-17 | 5.9 | 5.9 | 58.2 | 57.6 | 52 | 18.1 | MeO— 0.16 | o |
| Example 18 | Z-18 | 5.9 | 6.0 | 58.2 | 58.5 | 83 | 27.6 | MeO— 0.14 | o |
| Example 19 | Z-19 | 16.3 | 15.9 | 48.8 | 49.3 | 40 | 25.4 | MeO— 0.05 | o |
| Example 20 | Z-20 | 7.4 | 7.8 | 27.4 | 27.1 | 7 | 28.0 | i-PrO— 0.02 | o |
| Example 21 | Z-21 | 9.3 | 9.1 | 17.2 | 16.0 | 10 | 26.3 | MeO— 0.08 | o |
| Example 22 | Z-22 | 9.0 | 8.9 | 14.9 | 15.2 | 7 | 27.1 | i-PrO— 0.06 | o |
| Example 23 | Z-23 | 8.3 | 8.8 | 57.6 | 57.3 | 65 | 22.6 | MeO— 0.03 | o |
| Example 24 | Z-24 | — | 30.0 | 58.4 | 58.7 | 76 | 21.0 | MeO— 0.18 | o |
| Example 25 | Z-25 | — | 30.0 | 58.2 | 58.6 | 66 | 13.9 | MeO— 0.02 | o |
| Example 26 | Z-26 | — | 30.0 | 58.3 | 57.9 | 62 | 18.5 | MeO— 0.04 | o |
| Example 27 | Z-27 | — | 30.0 | 58.3 | 58.3 | 56 | 19.0 | MeO— 0.02 | o |
| Example 28 | Z-28 | — | 30.0 | 58.6 | 58.4 | 65 | 18.9 | MeO— 0.01<br>i-PrO— 0.13 | o |

In Tables 6 and 7 above,
MeO— denotes methoxy group;
i-Pro— denotes isopropoxy group; and
BuO— denotes butoxy group.

COMPARATIVE EXAMPLE 2

(Radical graft polymerization from colloidal silica surface)

Into a 500 ml flask equipped with a stirrer, thermometer and condenser were added 0.2 g of colloidal silica (AEROSIL 200 made by Nippon Aerosil Co., Ltd.; average particle diameter 12 nm (catalogue value)), 5 g of γ-glycidoxypropyltrimethoxysilane and 300 g of n-butyl acetate. The contents of the flask were refluxed at 120° C. for 10 hours. Then, 5.5 g of 4,4'-azobis(cyanovaleric acid) and 0.1 g of triethylamine were added into the flask, and the contents of the flask were heated while stirred at 40° C. for 3 hours; whereby azo groups were introduced into surfaces of the colloidal silica. Next, a N₂ gas-introducing tube was installed to the flask, and 100 g of methyl methacrylate was added into the flask. The contents of the flask were heated to 70° C. (while stirred), maintained at 70° C. for 6 hours, and then further heated to 100° C. and maintained at 100° C. for 1 hour; whereby a polymerization reaction was carried out. As a result, formation of a large amount of cohered product was seen in the resulting reaction slurry. The supernatant of the slurry was taken out to examine a particle diameter distribution. As a result, compound fine particles in the obtained dispersion had an average particle diameter of 380 nm and a variation coefficient of 275%, and so had a very broad particle diameter distribution. In addition, no alkoxy group was found in the particles.

COMPARATIVE EXAMPLE 3

(Treatment of colloidal silica with silyl-etherized polymer)

Into a 200 ml flask equipped with a stirrer, thermometer and condenser were added 7.7 g of a polyol (obtained by a dehydration reaction of 1,10-decanediol), 15 g of diethoxy-dimethylsilane and 135 g of tetrahydrofuran (THF). The contents of the flask were refluxed at 65° C. for 15 hours and then dried at 150° C. under a vacuum of 100 mmHg; whereby a silyl-etherized polymer was obtained. This polymer had a number-average molecular weight of 7,000 and a ash content of 26.2%. Next, into a 200 ml flask equipped with a stirrer, thermometer and condenser were added 2 g of a dispersion (in which colloidal silica (obtained by solvent displacement; average diameter 37 nm; variation coefficient 53%) was dispersed in 1,2-dimethoxyethane (containing 30% of $SiO_2$)), 1 g of the above-obtained silyl-etherized polymer and 130 g of 1,2-dimethoxyethane. The contents of the flask was refluxed at 80° C. for 10 hours. Methanol was added to the resulting reaction liquid to carry out reprecipitation, and then the formed precipitate was examined by elemental analysis. However, the ash content of the precipitate was almost the same as that (26.0%) in the silyl-etherized polymer (used as a raw material). In addition, the reaction liquid was analyzed by GPC. As a result, only a polymer having a number-average molecular weight of 7,000 was detected, and so it was confirmed that the silyl-etherized polymer does not bond with colloidal silica by the heating in a liquid phase. Although the reaction liquid was dried at 150° C. under a vacuum of 100 mmHg and then the dried product was again dispersed into THF, formation of a small amount of precipitate was seen. The supernatant was taken out to examine a particle diameter distribution. As a result, compound fine particles in the obtained dispersion had an average particle diameter of 92 nm and a variation coefficient of 128%, and so had a very broad particle diameter distribution. In addition, no alkoxy group was found in the particles.

COMPARATIVE EXAMPLE 4

(Treatment of colloidal silica with coupling agent and with acid group-containing polymer)

Into a 200 ml flask equipped with a stirrer, dropping funnel, thermometer, condenser and N₂ gas-introducing tube was placed 80 g of isopropyl alcohol (IPA). While introducing an N₂ gas into the flask and stirring the contents of the flask, the inside temperature of the flask was raised to 80° C. Next, a solution (which was beforehand prepared by mixing 56 g of acrylic acid, 24 g of methyl acrylate and 0.4 g of 2,2'-azobisisobutyronitrile with each other) was dropwise added into the flask from the dropping funnel over a period of 1 hour. After completion of the adding, the stirring was further continued at 80° C. for 2 hours to carry out a copolymerization reaction; whereby there was obtained an IPA solution of an acrylic acid/methyl acrylate copolymer having a number-average molecular weight of 8,000. Next, into a 500 ml flask equipped with a stirrer were placed 133 g of a dispersion (in which colloidal silica (average diameter 35 nm; variation coefficient 58%) was dispersed in ethylene glycol (containing 30% of $SiO_2$)), 267 g of ethylene glycol, 0.4 g of γ-glycidoxypropyltrimethoxysilane and 0.4 g of water. The contents of the flask was stirred at room temperature for 2 hours, whereby a colloidal silica slurry (A) (which had been treated with a coupling agent) was obtained. To this slurry (A) was added 1 g of the above-obtained IPA solution of the acrylic acid/methyl acrylate copolymer. The resulting mixture was stirred at room temperature for 1 hour to obtain a slurry (B). Hexane was added to this slurry (B) to carry out reprecipitation, and then the formed precipitate was examined by elemental analysis. However, no ash content of the precipitate was detected. In addition, the slurry (B) was analyzed by GPC. As a result, only a polymer having a number-average molecular weight of 8,000 was detected, and so it was confirmed that the acrylic acid/methyl acrylate copolymer does not bond with colloidal silica by the above-mentioned process. Although the slurry (B) was dried at 150° C. under a vacuum of 100 mmHg and then the obtained compound fine particles were mixed with ethylene glycol or IPA; the particles hardly re-dispersed and so there was obtained only a dispersion in which most of the particles were cohered or precipitated. In addition, no alkoxy group was found in the particles.

COMPARATIVE EXAMPLE 5

(Treatment of colloidal silica with polymer silane-coupling agent)

Into a 200 ml flask equipped with a stirrer, dropping funnel, thermometer, condenser and $N_2$ gas-introducing tube was placed 80 g of n-butyl acetate. While introducing an $N_2$ gas into the flask and stirring the contents of the flask, the inside temperature of the flask was raised to 120° C. Next, a solution (which was beforehand prepared by mixing 80 g of methyl methacrylate, 5 g of 3-mercaptopropionic acid and 0.8 g of 2,2'-azobisisobutyronitrile with each other) was dropwise added into the flask from the dropping funnel over a period of 1 hour. After completion of the adding, the stirring was further continued at 120° C. for 2 hours to carry out a polymerization reaction; whereby there was obtained a polymer having an acid group at the terminal. Into the flask were added 10.5 g of γ-aminopropyltriethoxysilane and 50 mg of N,N'-dicyclohexylcarbodiimide. The contents of the flask were stirred at 100° C. for 1 hour, whereby a polymer silane-coupling agent was obtained. This agent had a number-average molecular weight of 9,000 and an ash content of 3.0%. Next, into a 1-liter flask equipped with a stirrer, thermometer and condenser were placed 500 g of 1,2-dimethoxyethane, 2 g of a dispersion (in which colloidal silica (average diameter 40 nm; variation coefficient 48%) was dispersed in ethanol (containing 30% of $SiO_2$)), 2 g of the above-obtained solution of the polymer silane-coupling agent and 1 g of a 5% aqueous ammonia solution. The contents of the flask was stirred at 60° C. for 2 hours. Hexane was added to the resulting liquid to carry out reprecipitation, and then the formed precipitate was examined by elemental analysis. However, the ash content of the precipitate was almost the same as that in the polymer silane-coupling agent (used as a raw material). In addition, the reaction liquid was analyzed by GPC. As a result, only a polymer having a number-average molecular weight of 9,000 was detected, and so it was confirmed that the polymer silane-coupling agent does not bond with colloidal silica by the above-mentioned process. Although the reaction liquid was dried at 150° C. under a vacuum of 100 mmHg and then the dried product was again dispersed into n-butyl acetate, formation of a small amount of precipitate was seen. The supernatant was taken out to examine a particle diameter distribution. As a result, compound fine particles in the obtained dispersion had an average particle diameter of 250 nm and a variation coefficient of 78%, and so had a very broad particle diameter distribution. In addition, 0.06 mmol/g of methoxy groups was detected in the particles.

COMPARATIVE EXAMPLE 6

(Treatment of colloidal silica with organic polymer (P))

Into a 300 ml flask equipped with a stirrer, thermometer and condenser were placed 160 g of ethyl cellosolve, 50 g of a dispersion (in which colloidal silica (average diameter 31 nm; variation coefficient 60%) was dispersed in methanol (containing 30% of $SiO_2$)), 20 g of a toluene solution of the organic polymer (P-1) (obtained in Production Example 5; number-average molecular weight 12,000; ash content 5.8%) and 1 g of a 5% aqueous ammonia solution. The contents of the flask was stirred at 60° C. for 2 hours. Hexane was added to the resulting liquid to carry out reprecipitation, and then the formed precipitate was examined by elemental analysis. However, the ash content of the precipitate was almost the same as that (5.7%) in the organic polymer (P-1). In addition, the reaction liquid was analyzed by GPC. As a result, a polymer having a number-average molecular weight of 12,000 was detected, and so it was confirmed that the organic polymer (P-1) does not bond with colloidal silica by the above-mentioned process. Although the reaction liquid was dried at 150° C. under a vacuum of 100 mmHg and then the dried product was again dispersed into toluene, formation of a small amount of precipitate was seen. The supernatant was taken out to examine a particle diameter distribution. As a result, compound fine particles in the obtained dispersion had an average particle diameter of 143 nm and a variation coefficient of 113%, and so had a very broad particle diameter distribution. In addition, 0.06 mmol/g of methoxy groups was detected in the particles.

EXAMPLE 29

The dispersion (Z-24) (obtained in Example 24) was coated on a glass base plate using a bar coater and then dried at room temperature for 30 minutes and further at 60° C. for 40 minutes; whereby there was obtained a coated film which was transparent and glossy and therefore good.

EXAMPLE 30

Three grams of an isocyanate hardener ("SUMIDUR N-3800" made by Sumitomo Chemical Co., Ltd.) was added to and mixed with 100 g of the dispersion (Z-24) (obtained in Example 24), and the resulting mixture was coated on a glass base plate using a bar coater and then dried at room temperature for 30 minutes and further at 80° C. for 60 minutes; whereby there was obtained a coated film which was transparent and glossy and therefore good.

EXAMPLE 31

Eight grams of a hardener ("SUPER BEKKAMIN J820-60" made by Dainippon Ink and Chemicals, Inc.) was added to and mixed with 100 g of the dispersion (Z-24) (obtained in Example 24), and the resulting mixture was coated on a glass base plate using a bar coater and then dried at room temperature for 30 minutes and further at 150° C. for 30 minutes; whereby there was obtained a coated film which was transparent and glossy and therefore good.

EXAMPLE 32

Eighty grams of an acrylic resin ("AROTHANE 2060" made by Nippon Shokubai Co., Ltd.) was mixed into 100 g of the dispersion (Z-24) (obtained in Example 24), whereby a resin mixture was obtained. Although this resin mixture was stored in an airtight vessel at 50° C. for 1 month, neither cohesion nor increase in viscosity was seen. Fourteen grams of an isocyanate hardener ("SUMIDUR N-3500" made by Sumitomo Chemical Co., Ltd.) was added to and mixed with the resin mixture, and the resulting mixture was coated on a glass base plate using a bar coater and then dried at room temperature for 30 minutes and further at 80° C. for 60 minutes; whereby there was obtained a coated film which was transparent and glossy and therefore good.

EXAMPLE 33

Eighty grams of an alkyd resin ("AROPLAZ OB-110" made by Nippon Shokubai Co., Ltd.) was mixed into 100 g of the dispersion (Z-24) (obtained in Example 24), whereby a resin mixture was obtained. Although this resin mixture was stored in an airtight vessel at 50° C. for 1 month, neither cohesion nor increase in viscosity was seen. Fifteen grams of a hardener ("SUPER BEKKAMIN J820-60" made by Dainippon Ink and Chemicals, Inc.) was added to and mixed with the resin mixture, and the resulting mixture was coated on a glass base plate using a bar coater and then dried at room temperature for 30 minutes and further at 150° C. for 30 minutes; whereby there was obtained a coated film which was transparent and glossy and therefore good.

COMPARATIVE EXAMPLE 7

Fifty grams of a methanol silica dispersion (made by Nissan Chemical Industries, Ltd.) was mixed into 80 g of an acrylic resin ("AROTHANE 2060" made by Nippon Shokubai Co., Ltd.), whereby a resin mixture was obtained. Although this resin mixture was stored in an airtight vessel at room temperature, cohesion occurred in about 3 hours after the above-mentioned mixing. Before cohesion occurred, 14 g of an isocyanate hardener ("SUMIDUR N-3500" made by Sumitomo Chemical Co., Ltd.) was added to and mixed with the resin mixture. The resulting mixture was coated on a glass base plate using a bar coater and then dried at room temperature for 30 minutes and further at 80° C. for 60 minutes. However, the resulting coated film was cloudy in white, because of cohesion of particles, and also inferior with regard to the smoothness of the surface.

COMPARATIVE EXAMPLE 8

A resin mixture was prepared by mixing 50 g of the n-butyl acetate dispersion (particle concentration 30%) of the colloidal silica (of which the surface had been treated with the polymer silane-coupling agent obtained in Comparative Example 5), 80 g of an acrylic resin ("AROTHANE 2060" made by Nippon Shokubai Co., Ltd.) and 14 g of an isocyanate hardener ("SUMIDUR N-3500" made by Sumitomo Chemical Co., Ltd.) with each other. The resin mixture was coated on a glass base plate using a bar coater and then dried at room temperature for 30 minutes and further at 80° C. for 60 minutes. However, the resulting coated film was cloudy in white, because of cohesion of particles, and also inferior with regard to the smoothness of the surface.

EXAMPLES 34 TO 37

(Synthesis of compound fine particle dispersions (Z-29) to (Z-32))

The procedure of Example 1 was repeated except that the kind of each of the organic solvent, organic polymer (P) and metallic compound (G) as well as the amount of each of the organic solvent, aqueous ammonia solution and metallic compound (G) was changed to that shown in Table 8; whereby compound fine particle dispersions (Z-29) to (Z-32) were obtained. In Table 9 are shown the following data: the concentration of the compound fine particles in each dispersion; the inorganic matter content of the particles; the average particle diameter of the particles; the variation coefficient of the particles; the alkoxy group content of the particles; and the stability of each dispersion over a period of time.

TABLE 8

| | | Formulation of reaction liquid (g) | | | | | |
|---|---|---|---|---|---|---|---|
| | | Solvent initially charged into reaction vessel | Raw material liquid (A) | | | Raw material liquid (B) | |
| | Dispersion | | Organic polymer (P) | Organic solvent | Metallic compound (G) | 25% NH₃aq | Organic solvent |
| Example 34 | Z-29 | AcOBu 160 MeOH 40 | P-11 40 | AcOBu 40 | MS 60 | 40 | MeOH 40 |
| Example 35 | Z-30 | AcOEt 200 MeOH 50 | P-12 20 | AcOEt 20 | MS 30 | 20 | MeOH 20 |
| Example 36 | Z-31 | BuOH 200 MeOH 50 | P-13 20 | BuOH 20 | MS 30 | 20 | MeOH 20 |
| Example 37 | Z-32 | i-PrOH 200 | P-14 15 | i-PrOH 15 | MS 25 | 50 | — |
| Example 38 | Z-33 | AcOBu 250 MeOH 90 | P-1 4 | — | Ms 40 | 25 | MeOH 20 |
| Example | Z-34 | AcOBu 120 | P-12 | AcOBu | ZrBu 10 | 20 | MeOH 50 |

TABLE 8-continued

| | | Formulation of reaction liquid (g) | | | | | |
|---|---|---|---|---|---|---|---|
| | | Solvent initially charged into reaction vessel | Raw material liquid (A) | | Raw material liquid (B) | | |
| | | | Organic | | Metallic | | |
| | Dispersion | | polymer (P) | Organic solvent | compound (G) | 25% NH$_3$aq | Organic solvent |
| 39 | | MeOH 30 | 50 | 10 | | | |
| Example 40 | Z-35 | AcOBu 120 MeOH 30 | P-12 50 | AcOBu 10 | AlIP 10 | 20 | MeOH 50 |
| Example 41 | Z-36 | AcOBu 120 MeOH 30 | P-12 50 | AcOBu 10 | TiIP 10 | 20 | MeOH 50 |

In TABLE 8 above,
AcOBU denotes n-butyl acetate;
MeOH denotes methanol;
MS denotes tetramethoxysilane;
AcOEt denotes ethyl acetate;
BuOH denotes butanol;
i-PrOH denotes isopropanol;
ZrBu denotes zirconium butoxide;
AlIP denotes aluminum isopropoxide; and
TiIP denotes titanium isopropoxide.

EXAMPLE 38

(Synthesis of compound fine particle dispersion (Z-33))

Into a four-necked 500 ml flask equipped with a stirrer, dropping funnel and thermometer were placed 250 g of n-butyl acetate, 90 g of methanol and 25 g of a 25% aqueous ammonia solution. Then, the inside temperature of the flask was adjusted to 20° C. Next, while the contents of the flask were stirred, a mixed liquid of 4 g of a n-butyl acetate solution of the organic polymer (P-1) (obtained in Production Example 5) with 40 g of tetramethoxysilane was dropwise added from the dropping funnel into the flask over a period of 1 hour. After completion of the dropwise addition, the resulting mixture was stirred at 20° C. for 2 hours, whereby a compound fine particle dispersion (Z-33) was obtained. In Table 9 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 39

(Synthesis of compound fine particle dispersion (Z-34))

Into a four-necked 500 ml flask equipped with a stirrer, thermometer and two dropping funnels (A and B) were placed 120 g of n-butyl acetate and 30 g of methanol, and then the inside temperature of the flask was adjusted to 20° C. Next, while the contents of the flask were stirred, raw material liquids A and B were dropwise added from the dropping funnels A and B, respectively, into the flask over a period of 1 hour. The raw material liquid A was a solution prepared by mixing 50 g of a toluene solution of the organic polymer (P-13) (obtained in Production Example 17), 10 g of zirconium butoxide and 10 g of n-butyl acetate with each other; and the raw material liquid B was a solution prepared by mixing 20 g of a 25% aqueous ammonia solution with 50 g of methanol. After completion of the dropwise addition, the resulting mixture was stirred at 20° C. for 2 hours, whereby a compound fine particle dispersion (Z-39) was obtained. In Table 9 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 40

(Synthesis of compound fine particle dispersion (Z-35))

The procedure of Example 39 was repeated except that aluminum isopropoxide was substituted for zirconium butoxide; whereby a compound fine particle dispersion (Z-35) was obtained. In Table 9 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 41

(Synthesis of compound fine particle dispersion (Z-36))

The procedure of Example 39 was repeated except that titanium isopropoxide was substituted for zirconium butoxide; whereby a compound fine particle dispersion (Z-36) was obtained. In Table 9 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 42

(Synthesis of compound fine particle dispersion (Z-37))

Into a four-necked 500 ml flask equipped with a stirrer, thermometer and distillation column (with which a condenser having an outlet for a distillate was connected) was placed 400 g of the dispersion (Z-1) (as obtained in Example 1). The inside temperature of the flask was raised to 100° C. under a pressure of 110 mmHg, and then ammonia, methanol, water and n-butyl acetate were distilled off till the solid content of the reaction mixture increased to 30%; whereby a dispersion (Z-37) (in which compound fine particles were dispersed in n-butyl acetate) was obtained. In Table 10 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLES 43 TO 44

(Synthesis of compound fine particle dispersions (Z-38) and (Z-39))

The procedure of Example 42 was repeated except that the dispersion (Z-2) (as obtained in Example 2) was substituted for the dispersion (Z-1) (as obtained in Example 1); whereby a dispersion (Z-38) (in which compound fine particles were dispersed in n-butyl acetate) was obtained. In addition, The procedure of Example 42 was repeated except that the dispersion (Z-29) (as obtained in Example 34) was substituted for the dispersion (Z-1) (as obtained in Example 1); whereby a dispersion (Z-39) (in which compound fine particles were dispersed in n-butyl acetate) was obtained. In Table 10 are shown the following data: the concentration of the compound fine particles in each dispersion; the inorganic matter content of the particles; the average particle diameter of the particles; the variation coefficient of the particles; the alkoxy group content of the particles; and the stability of each dispersion over a period of time.

EXAMPLE 45

(Synthesis of compound fine particle dispersion (Z-40))

Into a four-necked 500 ml flask equipped with a stirrer, thermometer and distillation column (with which a condenser having an outlet for a distillate was connected) were placed 250 g of the dispersion (Z-30) (as obtained in Example 35) and 100 g of n-butyl acetate. The inside temperature of the flask was raised to 100° C. under a pressure of 110 mmHg, and then ammonia, methanol, ethyl acetate, water and n-butyl acetate were distilled off till the solid content of the reaction mixture increased to 30%; whereby a dispersion (Z-40) (in which compound fine particles were dispersed in n-butyl acetate) was obtained. In Table 10 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 46

(Synthesis of compound fine particle dispersion (Z-41))

Into a four-necked 500 ml flask equipped with a stirrer, thermometer and distillation column (with which a condenser having an outlet for a distillate was connected) were placed 250 g of the dispersion (Z-31) (as obtained in Example 36) and 100 g of n-butyl acetate. The inside temperature of the flask was raised to 100° C. under a pressure of 110 mmHg, and then ammonia, methanol, butanol, water and n-butyl acetate were distilled off till the solid content of the reaction mixture increased to 80%; whereby a dispersion (Z-41) (in which compound fine particles were dispersed in n-butyl acetate) was obtained. In Table 10 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLE 47

(Synthesis of compound fine particle dispersion (Z-42))

Into a four-necked 500 ml flask equipped with a stirrer, thermometer and distillation column (with which a condenser having an outlet for a distillate was connected) were placed 250 g of the dispersion (Z-3Z) (as obtained in Example 37) and 100 g of n-butyl acetate. The inside temperature of the flask was raised to 100° C. under a pressure of 150 mmHg, and then ammonia, methanol, isopropyl alcohol and water were distilled off till the solid content of the reaction mixture increased to 30%; whereby a dispersion (Z-42) (in which compound fine particles were dispersed in water) was obtained. In Table 10 are shown the following data: the concentration of the compound fine particles in the dispersion; the inorganic matter content of the particles; the average particle diameter of the particles; the variation coefficient of the particles; the alkoxy group content of the particles; and the stability of the dispersion over a period of time.

EXAMPLES 48 TO 51

(Synthesis of compound fine particle dispersions (Z-43) and (Z-46))

The procedure of Example 24 was repeated except that the dispersions (Z-33) to (Z-36) (as obtained in Examples 38 to 41) were substituted for the dispersion (Z-7) (as obtained in Example 7); whereby dispersions (Z-43) and (Z-46) (in which compound fine particles were dispersed in n-butyl acetate) were obtained. In Table 10 are shown the following data: the concentration of the compound fine particles in each dispersion; the inorganic matter content of the particles; the average particle diameter of the particles; the variation coefficient of the particles; the alkoxy group content of the particles; and the stability of each dispersion over a period of time.

The dispersions (Z-29 to Z-46) (obtained in Examples 34 to 51 above) as well as supernatants (obtained by centrifugal separation of each of the dispersions (Z-29 to Z-46)) were analyzed by GPC. However, no organic polymer was detected. In addition, compound fine particles (which was a precipitate obtained by the above-mentioned centrifugal separation) were rinsed with THF or water, and then their rinsings were analyzed by GPC. However, no organic polymer was detected. This result shows that the organic polymers were not simply attached to, but strongly bound to the inorganic particles.

With regard to the dispersions (obtained in Examples 34 to 51 above), the following characters were analyzed and evaluated in the same way as of Example 1 to 28: the concentration of the compound fine particles in each dispersion; the inorganic matter content of the particles; the average particle diameter of the particles; the variation coefficient of the particles; the alkoxy group content of the particles; and the stability of each dispersion over a period of time.

TABLE 9

| | Dispersion | Concentration of compound fine particles (% by weight) | | Inorganic matter content of compound fine particles (% by weight) | | Average particle diameter (nm) | Variation coefficient (%) | Alkoxy group content of compound fine particles (mmol/g) | Stability over a period of time |
|---|---|---|---|---|---|---|---|---|---|
| | | Theoretical | Found | Theoretical | Found | | | | |
| Example 34 | Z-29 | 10.1 | 9.8 | 58.4 | 58.9 | 79 | 21.3 | MeO— 0.19 | o |
| Example 35 | Z-30 | 5.9 | 6.0 | 58.2 | 58.0 | 52 | 20.1 | MeO— 0.19 | o |
| Example 36 | Z-31 | 5.9 | 5.7 | 58.4 | 57.8 | 57 | 20.6 | MeO— 0.01 i-PrO— 0.14 | o |
| Example 37 | Z-32 | 5.6 | 5.8 | 60.7 | 61.3 | 63 | 18.0 | MeO— 0.01 BuO— 0.13 | o |
| Example 38 | Z-33 | 4.3 | 4.4 | 90.0 | 90.9 | 183 | 26.4 | MeO— 0.13 | o |
| Example 39 | Z-34 | 9.03 | 9.1 | 17.2 | 16.0 | 10 | 26.3 | MeO— 0.08 | o |
| Example 40 | Z-35 | 9.0 | 8.9 | 14.9 | 15.2 | 7 | 27.1 | i-PrO— 0.06 | o |
| Example 41 | Z-36 | 9.1 | 9.3 | 15.9 | 16.5 | 14 | 25.2 | MeO— 0.09 | o |

TABLE 10

| | Dispersion | Concentration of compound fine particles (% by weight) | | Inorganic matter content of compound fine particles (% by weight) | | Average particle diameter (nm) | Variation coefficient (%) | Alkoxy group content of compound fine particles (mmol/g) | Stability over a period of time |
|---|---|---|---|---|---|---|---|---|---|
| | | Theoretical | Found | Theoretical | Found | | | | |
| Example 42 | Z-37 | — | 30.0 | 58.2 | 57.8 | 57 | 16.8 | MeO— 0.14 | o |
| Example 43 | Z-38 | — | 30.0 | 6.0 | 6.3 | 8 | 27.9 | MeO— 0.18 | o |
| Example 44 | Z-39 | — | 30.0 | 58.4 | 59.0 | 82 | 20.8 | MeO— 0.18 | o |
| Example 45 | Z-40 | — | 30.0 | 58.2 | 58.0 | 55 | 19.5 | MeO— 0.20 | o |
| Example 46 | Z-41 | — | 30.0 | 58.4 | 57.4 | 57 | 20.2 | MeO— 0.01 i-PrO— 0.12 | o |
| Example 47 | Z-42 | — | 30.0 | 60.7 | 61.4 | 65 | 17.4 | MeO— 0.01 BuO— 0.12 | o |
| Example 48 | Z-43 | — | 30.0 | 90.0 | 90.7 | 180 | 25.6 | MeO— 0.14 | o |
| Example 49 | Z-44 | — | 30.0 | 17.2 | 16.5 | 12 | 25.9 | MeO— 0.08 | o |
| Example 50 | Z-45 | — | 30.0 | 14.9 | 15.1 | 8 | 27.0 | i-PrO— 0.06 | o |
| Example 51 | Z-46 | — | 30.0 | 15.9 | 16.4 | 15 | 25.4 | MeO— 0.08 | o |

In Tables 9 and 10 above,
MeO— denotes methoxy group;
i-PrO— denotes isopropoxy group; and
BuO— denotes botoxy group.

EXAMPLES 52 TO 64 AND COMPARATIVE EXAMPLES 9 TO 14

Resin mixtures were obtained by mixing the dispersions and the resins in accordance with the resin formulations as shown in Tables 11 and 12. Each of these resin mixtures was stored in an airtight vessel at 50° C. for 1 month to examine the appearance and the storage stability of the resin mixtures. Their results are shown in Tables 11 and 12. Titanium oxide (TIPAQUE CR-95 made by Ishihara Sangyo Kaisha, Ltd.) was added and well dispersed into the resin mixtures using a sand mill in the formulation where the pigment weight content was 40% by weight; whereby dispersions (hereinafter, referred to as liquids I-1) were obtained. In addition, liquids II-1 were prepared by measuring out a polyfunctional isocyanate (SUMIDUR N-3200 made by Sumitomo Bayer Urethane Co., Ltd.) in an amount such that the equivalent ratio of hydroxyl groups in each liquid I-1 to isocyanate groups in each liquid II-1 was 1:1. Each liquid I-1 was mixed with each liquid II-1 to obtain each coating composition. Each of the resulting coating compositions was coated on a soft steel sheet (having a thickness of 0.8 mm) in a film thickness of 30 μ, allowed to stand stationary at room temperature for 1 hour, and then dried at 80° C. for 2 hours; whereby each test piece for testing the performances was obtained. The performances of the resulting coated films were evaluated by the later-mentioned performance test methods. The evaluation results are shown in Tables 11 and 12.

TABLE 11

| | | | Example | | | | | | |
|---|---|---|---|---|---|---|---|---|---|
| | | | 52 | 53 | 54 | 55 | 56 | 57 | 58 |
| Formulation/ parts | Resin | AROTHANE 2020 | 80 | 80 | 80 | 80 | 80 | 80 | 80 |
| | | AROTHANE UW2817 | — | — | — | — | — | — | — |
| | | AROTHANE 2060 | — | — | — | — | — | — | — |
| | | AROSET 5210 | — | — | — | — | — | — | — |
| | | LUMIFLON LF200 | — | — | — | — | — | — | — |
| | Dispersion | Z-37 | 100 | — | — | — | — | — | — |
| | | Z-38 | — | 100 | — | — | — | — | — |
| | | Z-39 | — | — | 100 | — | — | — | — |
| | | Z-40 | — | — | — | 100 | — | — | — |
| | | Z-41 | — | — | — | — | 100 | — | — |
| | | Z-43 | — | — | — | — | — | 100 | — |
| | | Z-44 | — | — | — | — | — | — | 100 |
| | | Z-45 | — | — | — | — | — | — | — |
| | | Z-46 | — | — | — | — | — | — | — |
| Resin mixture | | Appearance | ⊚ | ⊚ | ⊚ | ⊚ | ⊚ | ⊚ | ⊚ |
| | | Storage stability | ⊚ | ⊚ | ⊚ | ⊚ | ⊚ | ⊚ | ⊚ |
| Coated film performance | | Dryness | ○ | ○ | ○ | ○ | ○ | ○ | ○ |
| | | Chemical resistance | ⊚ | ⊚ | ⊚ | ⊚ | ⊚ | ⊚ | ⊚ |
| | | Pencil hardness | 3H | H | 3H | 3H | 3H | 2H | 3H |
| | | Weather resistance | ⊚ | ⊚ | ⊚ | ⊚ | ⊚ | ⊚ | ⊚ |
| | | Dirt resistance | ⊚ | ○ | ⊚ | ⊚ | ⊚ | ⊚ | ⊚ |
| | | Adhesiveness | ⊚ | ⊚ | ⊚ | ⊚ | ⊚ | ⊚ | ⊚ |

| | | | Example | | | | | |
|---|---|---|---|---|---|---|---|---|
| | | | 59 | 60 | 61 | 62 | 63 | 64 |
| Formulation/ parts | Resin | AROTHANE 2020 | 80 | 80 | — | — | — | — |
| | | AROTHANE UW2817 | — | — | 80 | — | — | — |
| | | AROTHANE 2060 | — | — | — | 80 | — | — |
| | | AROSET 5210 | — | — | — | — | 80 | — |
| | | LUMIFLON LF200 | — | — | — | — | — | 80 |
| | Dispersion | Z-37 | — | — | — | — | — | — |
| | | Z-38 | — | — | — | — | — | — |
| | | Z-39 | — | — | 100 | 100 | 100 | 100 |
| | | Z-40 | — | — | — | — | — | — |
| | | Z-41 | — | — | — | — | — | — |
| | | Z-43 | — | — | — | — | — | — |
| | | Z-44 | — | — | — | — | — | — |
| | | Z-45 | 100 | — | — | — | — | — |
| | | Z-46 | — | 100 | — | — | — | — |
| Resin mixture | | Appearance | ⊚ | ⊚ | ⊚ | ⊚ | ⊚ | ⊚ |
| | | Storage stability | ⊚ | ⊚ | ⊚ | ⊚ | ⊚ | ⊚ |
| Coated film performance | | Dryness | ○ | ○ | ○ | ○ | ○ | ○ |
| | | Chemical resistance | ⊚ | ⊚ | ⊚ | ⊚ | △ | ⊚ |
| | | Pencil hardness | 3H | 3H | 3H | 4H | 4H | 3H |
| | | Weather resistance | ⊚ | ⊚ | ⊚ | ⊚ | ⊚ | ⊚ |
| | | Dirt resistance | ⊚ | ⊚ | ⊚ | ⊚ | ⊚ | ⊚ |
| | | Adhesiveness | ⊚ | ⊚ | ⊚ | ⊚ | ⊚ | ⊚ |

TABLE 12

| | | | Comparative Example | | | | | |
|---|---|---|---|---|---|---|---|---|
| | | | 9 | 10 | 11 | 12 | 13 | 14 |
| Formulation/ parts | Resin | AROTHANE 2020 | 80 | 80 | - | - | - | - |
| | | AROTHANE UW2817 | - | - | 80 | - | - | - |
| | | AROTHANE 2060 | - | - | - | 80 | - | - |
| | | AROSET 5210 | - | - | - | - | 80 | - |
| | | LUMIFLON LF200 | - | - | - | - | - | 80 |
| | Comparative dispersion A | | 100 | - | - | - | - | - |
| Resin mixture | | Appearance | X | ⊙ | ⊙ | ⊙ | ⊙ | ⊙ |
| | | Storage stability | X | ⊙ | ⊙ | ⊙ | ⊙ | ⊙ |

TABLE 12-continued

|  |  | Comparative Example | | | | | |
|---|---|---|---|---|---|---|---|
|  |  | 9 | 10 | 11 | 12 | 13 | 14 |
| Coated film performance | Dryness | ⊚ | ⊚ | ⊚ | ⊚ | ○ | ○ |
|  | Chemical resistance | ⊚ | ⊚ | ⊚ | ⊚ | X | ⊚ |
|  | Pencil hardness | 2H | HB | HB | H | 2H | HB |
|  | Weather resistance | ⊚ | ⊚ | ⊚ | ⊚ | ⊚ | ⊚ |
|  | Dirt resistance | X | Δ | Δ | Δ | Δ | Δ |
|  | Adhesiveness | X | ⊚ | ⊚ | ⊚ | ○ | ⊚ |

In Tables 11 and 12 above,
AROTHANE 2020 is an acrylic resin made by Nippon Shokubai Co., Ltd., and has a solid content of 60% and a hydroxyl value of 37.9 (in varnish);
AROTHANE UW2817 is an acrylic resin made by Nippon Shokubai Co., Ltd., and has a solid content of 60% and a hydroxyl value of 48 (in varnish);
AROTHANE 2060 is an acrylic resin made by Nippon Shokubai Co., Ltd., and has a solid content of 60% and a hydroxyl value of 48 (in varnish);
AROSET 5210 is an acrylic resin made by Nippon Shokubai Co., Ltd., and has a solid content of 45% and a hydroxyl value of 0 (in varnish);
LUMIFLON LF200 is a fluorocarbon resin made by Asahi Glass Company, Ltd., and has a solid content of 40% and a hydroxyl value of 29 (in varnish); and
comparative dispersion A is an isopropanol dispersion silica sol, made by Catalysts & Chemical Industries Co., Ltd. and has a solid content of 30%.

EXAMPLE 65 AND COMPARATIVE EXAMPLES 15 AND 16

Resin mixtures were obtained by mixing the dispersions and the resins in accordance with the resin formulations as shown in Table 13. Each of these resin mixtures was stored in an airtight vessel at 50° C. for 1 month to examine the appearance and the storage stability of the resin mixtures. Their results are shown in Table 13. Titanium oxide (TIPAQUE CR-95 made by Ishihara Sangyo Kaisha, Ltd.) was added and well dispersed into the resin mixtures using a sand mill in the formulation where the pigment weight content was 50% by weight; whereby dispersions (hereinafter, referred to as liquids I-2) were obtained. In addition, a polyfunctional isocyanate hardener (DESMODUR BL-3175 made by Sumitomo Bayer Urethane Co., Ltd.) was measured out in an amount such that the equivalent ratio of hydroxyl groups in each liquid I-2 to isocyanate groups in the polyfunctional isocyanate was 1:1; and then dibutyltin dilaurate was added as a hardening catalyst (in an amount of 1000 ppm of the resin mixture) to the measured-out polyfunctional isocyanate; whereby liquids II-2 were obtained. Each liquid I-2 was mixed with each liquid II-2 to obtain each coating composition. Each of the resulting coating compositions was coated on a soft steel sheet (having a thickness of 0.8 mm) in a film thickness of 15 μ, allowed to stand stationary at room temperature for 1 hour, and then dried at 240° C. for 1 hour; whereby each test piece for testing the performances was obtained. The performances of the resulting coated films were evaluated by the later-mentioned performance test methods. The evaluation results are shown in Table 13.

EXAMPLE 66 AND COMPARATIVE EXAMPLE 17

Resin mixtures were obtained by mixing the dispersions and the resins in accordance with the resin formulations as shown in Table 13. Each of these resin mixtures was stored in an airtight vessel at 50° C. for 1 month to examine the appearance and the storage stability of the resin mixtures. Their results are shown in Table 13. Titanium oxide (R-820 made by Ishihara Sangyo Kaisha, Ltd.) was added and well dispersed into the resin mixtures using a sand mill in the formulation where the pigment weight content was 50% by weight; whereby dispersions (hereinafter, referred to as liquids I-3) were obtained. In addition, the resin was combined with the hardener in the formulation shown in Table 13; whereby liquids II-3 were obtained. Each liquid I-3 was mixed with each liquid II-3 to obtain each coating composition. Each of the resulting coating compositions was coated on a soft steel sheet (having a thickness of 0.8 mm) in a film thickness of 15 μ, allowed to stand stationary at room temperature for 1 hour, and then dried at 170° C. for 16 minutes; whereby each test piece for testing the performances was obtained. The performances of the resulting coated films were evaluated by the later-mentioned performance test methods. The evaluation results are shown in Table 13.

EXAMPLE 67 AND COMPARATIVE EXAMPLE 18

Resin mixtures were obtained by mixing the dispersions and the resins in accordance with the resin formulations as shown in Table 13. Each of these resin mixtures was stored in an airtight vessel at 50° C. for 1 month to examine the appearance and the storage stability of the resin mixtures. Their results are shown in Table 13. Titanium oxide (TIPAQUE CR-95 made by Ishihara Sangyo Kaisha, Ltd.) was added and well dispersed into the resin mixtures using a sand mill in the formulation where the pigment weight content was 50% by weight; whereby dispersions (hereinafter, referred to as liquids I-4) were obtained. In addition, the resin was combined with the hardener in the formulation shown in Table 13; whereby liquids II-4 were obtained. Each liquid I-4 was mixed with each liquid II-4 to obtain each coating composition. Each of the resulting coating compositions was coated on a soft steel sheet (having a thickness of 0.8 mm) in a film thickness of 15 μ, allowed to stand stationary at room temperature for 1 hour, and then dried at 150° C. for 20 minutes; whereby each test piece for testing the performances was obtained. The performances of the resulting coated films were evaluated by the later-mentioned performance test methods. The evaluation results are shown in Table 13.

TABLE 13

|  |  |  | Example | | | Comparative Example | | | |
|---|---|---|---|---|---|---|---|---|---|
|  |  |  | 65 | 66 | 67 | 15 | 16 | 17 | 18 |
| Formula- | Resin | AROTHANE UW2816 | 50 | - | - | 100 | 50 | - | - |
| tion/ |  | AROPLAZ OB-10 | - | 50 | - | - | - | 80 | - |
| parts |  | AROSET 5835 | - | - | 50 | - | - | - | 80 |
|  | Dispersion Z-39 |  | 60 | 60 | 60 | - | - | - | - |
|  | Comparative dispersion A |  | - | - | - | - | 60 | - | - |
| Hardener |  | Hardener 1 | 26 | - | - | 30 | 26 | - | - |
|  |  | Hardener 2 | - | 26 | - | - | - | 26 | - |
|  |  | Hardener 3 | - | - | 26 | - | - | - | 26 |
| Resin mixture |  | Appearance | ⊚ | ⊚ | ⊚ | ⊚ | X | ⊚ | ⊚ |
|  |  | Storage stability | ⊚ | ⊚ | ⊚ | ⊚ | X | ⊚ | ⊚ |
| Coated film |  | Chemical resistance | ⊚ | o | ⊚ | ⊚ | ⊚ | Δ | ⊚ |
| performance |  | Pencil hardness | 5H | 5H | 5H | 3H | 4H | 2H | 3H |
|  |  | Dirt resistance | ⊚ | ⊚ | ⊚ | ⊚ | ⊚ | o | ⊚ |
|  |  | Adhesiveness | ⊚ | ⊚ | ⊚ | ⊚ | ⊚ | ⊚ | ⊚ |
|  |  | Flexibility | o | o | o | Δ | Δ | Δ | Δ |

In Table 13, above,
AROTHANE UW2816 is an acrylic resin made by Nippon Shokubai Co., Ltd., and has a solid content of 45% and a hydroxyl value of 40 (in varnish);
AROPLAZ OB-10 is an acrylic resin made by Nippon Shokubai Co., Ltd., and has a solid content of 70% and a hydroxyl value of 6 (in varnish);
AROSET 5835 is an acrylic resin made by Nippon Shokubai Co., Ltd., and has a solid content of 60% and a hydroxyl value of 33.2 (in varnish);
comparative dispersion A is an isopropanol dispersion silica Sol, made by Catalyst & Chemical Industries Co., Ltd., and has a solid content of 30%;
hardener 1 is DESMODUR BL-3175 made by Sumitomo Bayer Co., Ltd.;
hardener 2 is SUPER BEKKAMIN J-820 made by Dainippon Ink and Chemicals, Inc.; and
hardener 3 is SUPER BEKKAMIN 47-508-60 made by Dainippon Ink and Chemicals, Inc.

EXAMPLES 68 TO 70 AND COMPARATIVE EXAMPLES 19 TO 22

Resin mixtures were obtained by mixing the dispersions and the resins in accordance with the resin formulations as shown in Table 14. Each of these resin mixtures was stored in an airtight vessel at 50° C. for 1 month to examine the appearance and the storage stability of the resin mixtures. Their results are shown in Table 14. The hardener and the catalyst were added and mixed into each of the resin mixtures in the formulation as shown in Table 14; whereby the resin coating compositions were obtained. Each of the coating compositions was coated on an untreated dull steel sheet (having a thickness of 0.8 mm) in a film thickness of 30 μ, allowed to stand stationary at room temperature for 1 hour, and then dried at 60° C. for 20 minutes. The performances of the resulting coated films were evaluated by the later-mentioned performance test methods. The evaluation results are shown in Table 14.

TABLE 14

|  |  |  | Example | | | Comparative Example | | | |
|---|---|---|---|---|---|---|---|---|---|
|  |  |  | 68 | 69 | 70 | 19 | 20 | 21 | 22 |
| Formula— | Resin | AROLON 76 | 70 | — | — | 80 | — | — | 80 |
| tion/ |  | AROLON 460 | — | 70 | — | — | 80 | — | — |
| parts |  | AROLON 290 | — | — | 70 | — | — | 80 | — |
|  | Dispersion Z-42 |  | 30 | 30 | 30 | — | — | — | — |
|  | Comparative dispersion A |  | — | — | — | — | — | — | 100 |
| Hardener |  | Hardener 4 | 20 | — | — | 20 | — | — | — |
| Catalyst |  | DICNATE 3111 | — | — | 0.2 | — | — | 0.2 | — |
| Resin mixture |  | Appearance | $ | $ | $ | $ | $ | $ | X |
|  |  | Storage stability | * | * | * | * | * | * | X |

TABLE 14-continued

|  |  | Example | | | Comparative Example | | | |
|---|---|---|---|---|---|---|---|---|
|  |  | 68 | 69 | 70 | 19 | 20 | 21 | 22 |
| Coated film performance | Pencil hardness | 3H | 3H | HB | 2H | 2H | 4B | 3H |
|  | Dirt resistance | $ | $ | $ | Δ | Δ | Δ | Δ |
|  | Adhesiveness | * | Δ | * | * | X | * | $ |
|  | Corrosion resistance | 350 | 550 | 530 | 150 | 480 | 480 | 200 |

In Table 14 above,
AROLON 76 is an aqueous dispersion type resin made by Nippon Shokubai Co., Ltd., and has a solid content of 50%;
AROLON 480 is an aqueous dispersion type resin made by Nippon Shokubai Co., Ltd., and has a solid content of a 50%;
AROLON 280 is : an aqueous dispersion type resin made by Nippon Shokubai Co., Ltd., and has a solid content of 30%;
comparative dispersion A is an isopropanol dispersion silica sol, made by Catalysts & Chemical Industries Co., Ltd., and has a solid content of 30%;
hardener 4 is NIKALAC MW-22 made by Nippon carbide Industries Co., Ltd.; and
catalyst is DICNATE 3111 made by Dainippon Ink and Chemicals, Inc.

EXAMPLE 71 AND COMPARATIVE EXAMPLES 23 AND 24

Resin mixtures were obtained by mixing the dispersions and the resins in accordance with the resin formulations as shown in Table 15. Each of these resin mixtures was stored in an airtight vessel at 50° C. for 1 month to examine the appearance and the storage stability of the resin mixtures. Their results are shown in Table 15. The hardener and the catalyst were added and mixed into each of the resin mixtures in the formulation as shown in Table 15; whereby the resin coating compositions were obtained. Each of the coating compositions was coated on a Bonderite 3100 treated steel sheet (having a thickness of 0.8 mm) in a film thickness range of 5 to 10 μ, allowed to stand stationary at room temperature for 1 hour, and then dried at 200° C. for 10 minutes. The performances of the resulting coated films were evaluated by the later-mentioned performance test methods. The evaluation results are shown in Table 15.

TABLE 15

|  |  | Example | Comparative Example | |
|---|---|---|---|---|
|  |  | 71 | 23 | 24 |
| Formula- tion/ parts | Resin EPICOAT 1010 | 50 | 80 | 80 |
|  | Dispersion Z-39 | 30 | — | — |
|  | Comparative dispersion B | — | — | 30 |
| Hardener | HITANOL 4010 | 10 | 10 | 10 |
| Catalyst | S-475 | 0.3 | 0.3 | 0.3 |
| Resin mixture | Appearance | ⊚ | ⊚ | X |
|  | Storage stability | ⊚ | ⊚ | X |
| Coated film performance | Pencil hardness | 2H | F | H |
|  | Adhesiveness | ⊚ | ⊚ | O |
|  | Flexibility | ⊚ | ⊚ | O |

In Table 15 above,
EPICOAT 1010 is an epoxy resin made by Yuka Shell Epoxy Kabushiki Kaisha;
HITANOL 4010 is a phenol resol resin made by Hitachi Chemical Co., Ltd.;
S-475 is toluenesulfonic acid-morpholine acid; and comparative dispersion B is a methyl isobutyl ketone dispersion silica sol, made by Nissan Chemical Industries, Ltd., and has a solid content of 30%.

As to the resin mixtures obtained in the Examples and the Comparative Examples above; the appearance and the storage stability (as a result of the storage at 50° C. for 1 month) were evaluated by the following methods. In addition, the performances of the coated films (such as dryness, chemical resistance, pencil hardness, dirt resistance, weather resistance, adhesiveness, flexibility, and corrosion resistance) were analyzed and evaluated by the following methods.

(Appearance)
The condition of the coated film (such as presence or absence of agglomeration, unevenness and gloss of the surface) was evaluated by the naked eye in accordance with the following standard:

⊚: excellent, O: good,

Δ: acceptable, x: unacceptable.

(Storage stability)
Stability as a result of the storage at 50° C. for 1 month was examined and evaluated by the following standard:

⊚: stable,

O: the viscosity somewhat increased,

Δ: the viscosity increased, x: a large amount of cohered matters formed.

(Dryness)
It was evaluated by the finger touch of the coated film, after the forcible drying, in accordance with the following standard:

⊚: no change, O: a little trace was left, x: a strong trace was left.

(Chemical resistance)
The coated film was rubbed 50 times using absorbent cotton containing methyl ethyl ketone and then the surface condition of the film was evaluated by the following standard:

⊚: no change, O: the luster dulled, x: the film dissolved.

(Pencil hardness)
The pencil scratch test of JIS K5400-6.14 was carried out to evaluate the scratches made.

(Dirt resistance)
The coated film was coated 30 times with a 0.05% aqueous solution of carbon using a brush, forcibly dried at 80° C. for 1 hour, and then washed 30 times using a brush while rinsing with water to evaluate the degree of attachment of dirt to the film by the following standard:

⊚: no attachment, O: little attachment,

Δ: a little attachment, x: a certain attachment.

(Weather resistance)

The coated film was subjected to a weathering test for 3000 hours using a sunshine weatherometer, and then the condition of the film was evaluated by the following standard:

⊚: excellent, ○: good, Δ: normal, x: poor.

(Adhesiveness)

The cross hutch adhesion test of JIS K5400-6.15 was carried out to evaluate the adhesiveness by the following standard:

⊚: the film was not peeled off at all,

○: the film was slightly peeled off at intersecting points of the cross-cutting lines, Δ: the film was peeled off in an area range of 5 to 35%, x: the film was peeled off in an area of 35% or more.

(Flexibility)

Whether the coated film was cracked or peeled off by the bending test machine (which was regulated by JIS K5400-6.16 and had a center bar of 2 mm in diameter) was examined to evaluate the flexibility by the following standard:

⊚: excellent, ○: good, Δ: normal, x: poor.

(Corrosion resistance)

In a brine spray test, there was measured a period of time over which the maximum width of the blistered flakes at the cross-cut parts of the film was 2 mm or less. Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

Industrial Application

The compound fine particles of the present invention have an average particle diameter of 5 to 200 nm and a particle diameter variation coefficient of 50% or less, and so has a minute average particle diameter and a narrow particle diameter distribution. Therefore, the compound fine particles are particularly superior with regard to the dispersion stability and the affinity with an organic matrix in the use for coatings or molding materials when compared with conventional fine particles used for the same purposes.

The process of the present invention for producing compound fine particles can efficiently bind an organic polymer to surfaces of inorganic fine particles by a very simple step of hydrolyzing and condensing a particularly defined organic polymer (P) solely or together with a hydrolyzable metallic compound (G). Therefore, it is unnecessary to put a complicated drying process in the present production process as in conventional processes.

The dispersion (in which the compound fine particles are dispersed in water or an organic solvent) of the present invention is useful for an additive to various kinds of coatings and molding materials, and the dispersion itself can also be used as a composition for forming a film. Since the compound fine particles contained in the composition contain an organic polymer bound to surfaces of inorganic fine particles, the compound fine particles have excellent affinity with an organic matrix of a resin for coatings. So a coated film obtained by coating the composition on various base materials shows a glossy and preferable appearance, does not cause cracking, and has excellent properties, such as weather resistance, dirt resistance, dirt eliminatability, surface hardness, abrasion resistance, chemical resistance, adhesiveness and heat resistance.

Since the composition of the present invention for forming a film includes the dispersion containing the compound fine particles, the physical properties of the resultant film are improved in comparison with conventional compositions for forming a film. Therefore, the composition of the present invention gives a coated film having excellent properties, such as weather resistance, dirt resistance, dirt eliminatability, surface hardness, abrasion resistance, chemical resistance, adhesiveness and heat resistance.

Furthermore, if the organic polymer (constituting the compound fine particles contained in the composition for forming a film) contains a hydroxyl group and also if the composition for forming a film further includes at least one compound (J) selected from the group consisting of polyfunctional isocyanate compounds, melamine compounds and aminoplast resins; then, a crosslinked structure is formed, and the composition forms a coated film having excellent properties, such as weather resistance, dirt resistance, dirt eliminatability, surface hardness, abrasion resistance, chemical resistance, adhesiveness, heat resistance, flexibility, and storage stability. If the composition for forming a film further contains the polyol (Q), a firmer crosslinked structure is formed and the coated film properties are further improved.

The above-mentioned composition for forming a film can be coated on surfaces of various kinds of base materials (for example, metal materials for the uses, such as automobiles, ships, vehicles, building materials, electrical articles, industrial machines, drink cans, building and constructed products; inorganic materials; and organic materials, such as plastics) by utilizing the above-mentioned excellent film properties of the composition. Accordingly, the composition forms a coated film which is useful for the surface protection and make-up of the above-mentioned base materials.

What is claimed is:

1. Compound fine particles which comprise:

inorganic fine particles comprising silica;

an organic polymer bound to surfaces of said inorganic fine particles, said organic polymer comprising a (meth)acrylic monomer unit; and wherein the compound fine particles contain at least one kind of alkoxy group in a proportion of 0.01 to 50 mmol/g, have an average particle diameter of 5 to 200 nm, a particle diameter variation coefficient of 50% or less and an inorganic matter content of 50 to 99.5% by weight.

2. Compound fine particles as in claim 1, wherein said organic polymer is formable into a film.

3. A process for producing compound fine particles, which comprises a step of hydrolyzing and condensing an organic polymer (P) in the presence of a basic catalyst, wherein said organic polymer (P) has at least one polysiloxane group per molecule, said polysiloxane group containing at least one Si—OR$^1$ group, wherein R$^1$ denotes a hydrogen atom or at least one member selected from the group consisting of alkyl groups, acyl groups, substituted alkyl groups and substituted acyl groups; with the proviso that in the case where plural R$^1$ are included in one molecule of said polymer (P), the plural R$^1$ may be different from each other.

4. A process as in claim 3, wherein said hydrolyzing and condensing step includes a step of simultaneously adding raw material liquids (A) and (B) from separate sources to a reaction vessel, wherein said raw material liquid (A) includes said organic polymer (P), and wherein said raw material liquid (B) includes water.

5. A process as in claim 3, wherein said hydrolyzing and condensing step includes hydrolyzing and condensing said organic polymer (P) together with a hydrolyzable metallic compound (G).

6. A process as in claim 5, wherein said metallic compound (G) is at least one member selected from the group consisting of compounds shown by the following general formula (1) and their derivatives:

$$(R^2O)_m MR^3_{n-m} \quad (1)$$

wherein:

M denotes at least one metal element selected from the group consisting of Si, Al, Ti and Zr;

$R^2$ denotes a hydrogen atom or at least one member selected from the group consisting of alkyl groups, acyl groups, substituted alkyl groups and substituted acyl groups;

$R^3$ denotes at least one member selected from the group consisting of alkyl groups, cycloalkyl groups, aryl groups, aralkyl groups, substituted alkyl groups, substituted cycloalkyl groups, substituted aryl groups and substituted aralkyl groups;

n denotes a valence number of said metal element M; and m denotes an integer of 1 to n;

with the proviso that in the case where plural $R^2$ and/or $R^3$ are included in one molecule of said metallic compound (G), the plural $R^2$ and/or $R^3$ may be different from each other.

7. A process as in claim 6, wherein said hydrolyzing and condensing step includes a step of simultaneously adding raw material liquids (A) and (B) from separate sources to a reaction vessel, wherein said raw material liquid (A) includes said organic polymer (P) and said metallic compound (G), and wherein said raw material liquid (B) includes water.

8. A process as in claim 6, wherein said metallic compound (G) is at least one member selected from the group consisting of silane compounds (H) and their derivatives, and wherein said silane compounds (H) contain an Si element as said metal element M in said formula (1).

9. A process as in claim 8, wherein said hydrolyzing and condensing step includes a step of simultaneously adding raw material liquids (A) and (B) from separate sources to a reaction vessel, wherein said raw material liquid (A) includes said organic polymer (P) and said metallic compound (G), and wherein said raw material liquid (B) includes water.

10. The process of claim 3, wherein said organic polymer (P) is produced from a (meth)acrylic monomer.

11. The process of claim 3, wherein said particles have an average particle diameter of 5 to 200 nm and a particle diameter variation coefficient of 50% or less.

12. The process of claim 3, wherein said basic catalyst is selected from the group consisting of ammonia, organic amines, alkali metal compounds and basic ion-exchange resins.

13. The process of claim 3, wherein said basic catalyst is selected from the group consisting of sodium methoxide, sodium ethoxide, potassium methoxide, potassium ethoxide, potassium tertiary-butoxide, sodium hydroxide, and potassium hydroxide.

14. A compound fine particle dispersion which comprises:
compound fine particles and
a dispersion medium;
wherein said compound fine particles include:

inorganic fine particles comprising silica;

an organic polymer bound to surfaces of said inorganic fine particles, said organic polymer comprising a (meth)acrylic monomer unit and is formable into a film; and wherein said compound fine particles comprise at least one kind of alkoxy group in a proportion of 0.01 to 50 mmol/g, have an inorganic matter content of 50 to 99.5% by weight and have an average particle diameter of 5 to 200 nm and a particle diameter variation coefficient of 50% or less.

15. A compound fine particle dispersion which comprises:
compound fine particles and
a dispersion medium;

wherein said compound fine particles are obtained by a process including a step of hydrolyzing and condensing an organic polymer (p) in the presence of a basic catalyst, wherein said organic polymer (P) has at least one polysiloxane group per molecule, and wherein said polysiloxane group contains at least one Si—$OR^1$ group, wherein $R^1$ denotes a hydrogen atom or at least one member selected from the group consisting of alkyl groups, acyl groups, substituted alkyl groups and substituted acyl groups; with the proviso that in the case where plural $R^1$ are included in one molecule of said polymer (P), the plural $R^1$ may be different from each other.

16. The dispersion of claim 15, wherein said organic polymer (P) is produced from a (meth)acrylic monomer.

17. The dispersion of claim 15, wherein said particles have an average particle diameter of 5 to 200 nm and a particle diameter variation coefficient of 50% or less.

18. The dispersion of claim 15, wherein said basic catalyst is selected from the group consisting of ammonia, organic amines, alkali metal compounds and basic ion-exchange resins.

19. Compound fine particles comprising:
inorganic fine particles;
an organic polymer bound to surfaces of said inorganic fine particles; and
wherein the compound fine particles have an average particle diameter of 5 to 200 nm and a particle diameter variation coefficient of 50% or less;
wherein said compound find particles are produced by the process comprising the steps of:
hydrolyzing and condensing an organic polymer (P) in the presence of a basic catalyst,
wherein said organic polymer (P) has at least one polysiloxane group per molecule, said polysiloxane group containing at least one Si—$OR^1$ group, wherein $R^1$ denotes a hydrogen atom or at least one member selected from the group consisting of alkyl groups, acyl groups, substituted alkyl groups and substituted acyl groups; with the proviso that in the case where plural $R^1$ are included in one molecule of said polymer (P), the plural $R^1$ may be different from each other.

20. The compound fine particles of claim 19, wherein said organic polymer (P) is produced from a (meth)acrylic monomer.

21. The compound fine particles of claim 19, wherein said basic catalyst is selected from the group consisting of ammonia, organic amines, alkali metal compounds and basic ion-exchange resins.

22. A film-forming composition comprising a resin and a compound fine particle dispersion comprising:

compound fine particles and a dispersion medium;

wherein said compound fine particles including:
inorganic fine particles;
an organic polymer bound to surfaces of said inorganic fine particles; and
wherein said compound fine particles having an average particle diameter of 5 to 200 nm and a particle diameter variation coefficient of 50% or less, and wherein said compound fine particles are obtained by hydrolyzing and condensing an organic polymer (P) in the presence of a basic catalyst.

23. A film-forming composition as in claim 22, wherein said inorganic fine particles include silica.

24. A film-forming composition as in claim 23, wherein said organic polymer (P) contains a hydroxyl group, and wherein said composition further comprises at least one compound (J) selected from the group consisting of polyfunctional isocyanate compounds, melamine compounds and aminoplast resins.

25. A film-forming composition as in claim 24, which further comprises a polyol (Q) having two or more hydroxyl groups per molecule.

26. A film-forming composition as in claim 23, wherein said organic polymer contains a (meth)acrylic monomer unit and is formable into a film, and wherein said compound fine particles contain at least one kind of alkoxy group in a proportion of 0.01 to 50 mmol/g and have an inorganic matter content of 50 to 99.5% by weight.

27. A film-forming composition as in claim 26, wherein said organic polymer (P) contains a hydroxyl group, and wherein said composition further comprises at least one compound (J) selected from the group consisting of polyfunctional isocyanate compounds, melamine compounds and aminoplast resins.

28. A film-forming composition as in claim 27, which further comprises a polyol (Q) having two or more hydroxyl groups per molecule.

29. The film-forming composition of claim 22, wherein said organic polymer (P) is produced from a (meth)acrylic monomer.

30. The film-forming composition of claim 22, wherein said basic catalyst is selected from the group consisting of ammonia, organic amines, alkali metal compounds and basic ion-exchange resins.

31. A film-forming composition comprising a resin and a compound fine particle dispersion comprising:

compound fine particles and a dispersion medium;

wherein said compound fine particles are obtained by a process including a step of hydrolyzing and condensing an organic polymer (P) in the presence of a basic catalyst, wherein said organic polymer (P) has at least one polysiloxane group per molecule, and wherein said polysiloxane group contains at least one Si—OR$^1$ group, wherein R$^1$ denotes a hydrogen atom or at least one member selected from the group consisting of alkyl groups, acyl groups, substituted alkyl groups and substituted acyl groups; with the proviso that in the case where plural R$^1$ are included in one molecule of said polymer (P), the plural R$^1$ may be different from each other.

32. A film-forming composition as in claim 31, wherein said organic polymer (P) contains a hydroxyl group, and wherein said composition further comprises at least one compound (J) selected from the group consisting of polyfunctional isocyanate compounds, melamine compounds and aminoplast resins.

33. A film-forming composition as in claim 32, which further comprises a polyol (Q) having two or more hydroxyl groups per molecule.

34. The film-forming composition of claim 31, wherein said organic polymer (P) is produced from a (meth)acrylic monomer.

35. The film-forming composition of claim 31, wherein said particles have an average particle diameter of 5 to 200 nm and a particle diameter variation coefficient of 50% or less.

36. The film-forming composition of claim 31, wherein said basic catalyst is selected from the group consisting of ammonia, organic amines, alkali metal compounds and basic ion-exchange resins.

* * * * *